United States Patent
Yang et al.

(10) Patent No.: US 12,533,360 B2
(45) Date of Patent: Jan. 27, 2026

(54) INHIBITION OF BRD PROTEINS SUPPRESSES THE PHENOTYPE OF UTERINE FIBROIDS

(71) Applicant: The University of Chicago, Chicago, IL (US)

(72) Inventors: Qiwei Yang, Bolingbrook, IL (US); Ayman Al-Hendy, Hinsdale, IL (US)

(73) Assignee: The University of Chicago, Chicago, IL (US)

( * ) Notice: Subject to any disclaimer, the term of this patent is extended or adjusted under 35 U.S.C. 154(b) by 0 days.

(21) Appl. No.: 17/968,403

(22) Filed: Oct. 18, 2022

(65) Prior Publication Data

US 2023/0122797 A1    Apr. 20, 2023

Related U.S. Application Data

(60) Provisional application No. 63/256,855, filed on Oct. 18, 2021.

(51) Int. Cl.
| | | |
|---|---|---|
| *A61K 31/551* | (2006.01) | |
| *A61K 31/4365* | (2006.01) | |
| *A61K 31/437* | (2006.01) | |
| *A61P 15/00* | (2006.01) | |

(52) U.S. Cl.
CPC ........ *A61K 31/551* (2013.01); *A61K 31/4365* (2013.01); *A61K 31/437* (2013.01); *A61P 15/00* (2018.01)

(58) Field of Classification Search
CPC .............. A61K 31/551; A61K 31/4365; A61K 31/437; A61P 15/00
See application file for complete search history.

(56) References Cited

PUBLICATIONS

Krämer et al. "BRD9 Inhibition, Alone or in Combination with Cytostatic Compounds as a Therapeutic Approach in Rhabdoid Tumors," Int. J. Mol. Sci. 2017, 18, 1537. (Year: 2017).*
Choi et al. "Integrated mutational landscape analysis of uterine leiomyosarcomas," PNAS2021 vol. 118 No. 15 e2025182118, published Apr. 5, 2021. (Year: 2021).*
U.S. Appl. No. 17/968,386, filed Oct. 18, 2022.
U.S. Appl. No. 18/345,461, filed Jun. 30, 2023.
Bulun et al., "Uterine Fibroids," *N Engl J Med*, 369: 1344-1355 (Oct. 2013).
Deng et al., "RNA N6-methyladenosine modification in cancers: current status and perspectives," *Cell Res.*; 28(5): 507-517 (May 2018). Published online Apr. 23, 2018.
Dobin et al., "STAR: ultrafast universal RNA-seq aligner," *Bioinformatics*, 29(1): 1-7 (Jan. 2013). Published online Oct. 25, 2012.
Fu et al., "Gene expression regulation mediated through reversible $m^6A$ RNA methylation," *Nat Rev Genet.* (5): 293-306 (May 2014). Published online Mar. 25, 2014.
Fujisawa et al., "Functions of bromodomain-containing proteins and their roles in homeostasis and cancer," *Nat Rev Mol Cell Biol*, (18): 246-262 (Apr. 2017). Published online Jan. 5, 2017.
Klionsky et al., "Guidelines for the use and interpretation of assays for monitoring autophagy (4th edition)," *Autophagy*, 17(1): 1-382 (Jan. 2021). Published online Feb. 8, 2021.
Kulikowski et al.,"Inhibitors of bromodomain and extra-terminal proteins for treating multiple human diseases," *Med Res Rev*; 41(1): 223-245. (Jan. 2021) Published online Sep. 14, 2020.
Patel et al. "Alternative therapies in management of leiomyomas," *Fertil Steril*; 102(3): 649-55 (Sep. 2014) Published online Aug. 5, 2014.
Shi et al., "Where, When, and How: Context-Dependent Functions of RNA Methylation Writers, Readers, and Erasers," *Mol Cell.*; 74(4): 640-650, (May 2019), author manuscript as published in PubMed.
Stewart et al., "Carfilzomib, Lenalidomide, and Dexamethasone for Relapsed Multiple Myeloma," *N Engl J Med*; 372: 142-152 (Jan. 2015). Published online Dec. 6, 2014.
Yang et al., "The Mechanism and Function of Epigenetics in Uterine Leiomyoma Development," *Reprod Sci.*, 23(2): 163-75 (Feb. 2016). Published online Apr. 28, 2015.
Yang et al., "Early Life Adverse Environmental Exposures Increase the Risk of Uterine Fibroid Development: Role of Epigenetic Regulation," *Front Pharmacol.*, (7): 1-10 (Mar. 2016).
Yang et al., "The Functional Role and Regulatory Mechanism of Bromodomain-Containing Protein 9 in Human Uterine Leiomyosarcoma," *Cells*, 11(14): 1-22 (Jul. 2022).
Yang et al., "Targeting the Class I Histone Deacetylases in Uterine Leiomysarcoma," *Reproductive Sciences*, 29(1): 232A (Mar. 2022) (1 page) , abstract No. F-102 (1 page).
Yang et al., "Transcriptome Analysis Reveals BRD9 Inhibition-Induced Distinct Pathways in Uterine Fibroids," *Reproductive Sciences*, 29(1): 206A (Mar. 2022), abstract No. F-038, (1 page).
Yang et al., "Targeting Class I Histone Deacetylases in Human Uterine Leiomyosarcoma," *Cells*, 11: 1-27 (Nov. 2022).
Yang et al., "The Functional Role and Regulatory Mechanism of FTO m6A RNA Demethylase in Human Uterine Leiomyosarcom," *International Journal of Molecular Sciences*, 24(9): 1-17 (Apr. 2023).
Yang et al., "Inhibition Of BRD Proteins Suppresses The Phenotype Of Uterine Fibroids Via Regulation Of N6-Methyladenosine Regulators," *Fertil Steril* 116(3): 11 (Oct. 2021), abstract No. O-26 (1 page).
Yang et al., "Inhibition Of BRD Proteins Suppresses The Phenotype Of Uterine Fibroids Via Regulation Of N6-Methyladenosine Regulators," slide presentation associated with *Fertil Steril* 116(3): 11 (Oct. 2021), abstract No. O-26, presentation given Oct. 18, 2021 (15 pages).

(Continued)

*Primary Examiner* — Adam C Milligan
*Assistant Examiner* — William Y Lee
(74) *Attorney, Agent, or Firm* — Leydig, Voit & Mayer, Ltd.

(57) ABSTRACT

In aspects, the present disclosure provides a method of treating or preventing a uterine fibroid in a female mammal, the method comprising, consisting essentially of, or consisting of administering to the female mammal an effective amount of an inhibitor of bromodomain (BRD) protein.

12 Claims, 27 Drawing Sheets

(56) References Cited

PUBLICATIONS

Yang et al., "Aberrant Expression Of N6-Methyladenosine Regulators In Uterine Fibroids From The Eker Rat Model," *Fertil Steril*, 116(3): e12-e13 (Oct. 2021), abstract No. O-29 (2 pages).
Yang et al., "Aberrant Expression Of N6-Methyladenosine Regulators In Uterine Fibroids From The Eker Rat Model," slide presentation associated with *Fertil Steril*, 116(3): e12-e13 (Oct. 2021), abstract No. O-29, presentation given Oct. 18, 2021 (13 pages).
Yang et al., "The Functional Role and mechanism of Bromodomain-Containing Protein 9 In Human Uterine Leiomyosarcoma," *Fertil Steril*, 24(9): e229 (Oct. 2022), abstract No. P-288 (1 page).
Yang et al., "The Functional Role and mechanism of Bromodomain-Containing Protein 9 In Human Uterine Leiomyosarcoma," poster presentation associated with *Fertil Steril*, 24(9): e229 (Oct. 2022), abstract No. P-288, presentation given Oct. 25, 2022 (11 pages).
Yang et al., "The Regulatory Mechanism Of Histone Deacetylases In Epigenetic Regulation: Emerging Paradigms From Hdac Inhibition Studies In Uterine Leiomyosarcoma," *Fertil Steril*, (118): e338 (Oct. 2022), abstract No. P-543 (1 page).
Yang et al., "The Regulatory Mechanism Of Histone Deacetylases In Epigenetic Regulation: Emerging Paradigms From Hdac Inhibition Studies In Uterine Leiomyosarcoma," poster presentation associated with *Fertil Steril*, (118): e338 (Oct. 2022), abstract No. P-543, presentation given Oct. 26, 2022 (8 pages).
Yang et al., "Bromodomain Containing 9 Regulates Signaling Pathways and Reprograms the Epigenome in Human Uterine Fibroid Cells," Posted date Jul. 18, 2023. (preprint) Preprints (database online), [retrieved on Oct. 4, 2023]. Retrieved from the Internet: <URL: https://www.preprints.org/manuscript/202307.1154/v1><DOI: https://doi.org/10.20944/preprints202307.1154.v1> (20 pages).
Yang et al., "Pathological reprogramming of epitranscriptomics via METTL3 in Uterine Fibroids," *Reproductive Sciences*, (28)1: 128A-129A (Jul. 2021), abstract No. W-046 (1 page).
Chen et al., "Topoisomerase IIa in Chromosome Instability and Personalized Cancer Therapy," Oncogene, 34(31): 4019-4031 (Jul. 2015), author manuscript as published in PubMed.
Conconi et al., "Genomic and Epigenomic Profile of Uterine Smooth Muscle Tumors of Uncertain Malignant Potential (STUMPs) Revealed Similarities and Differences with Leiomyomas and Leiomyosarcomas," Int. J. Mol. Sci., 22(1580): 1-16 (Feb. 2021). Published online Feb. 4, 2021.
Costa et al., "Targeting the PI3K/AKT/mTOR pathway in triple-negative breast cancer: a review," Breast Cancer Res. Treat., 169(3): 397-406. (Jun. 2018). Published online Feb. 7, 2018.
Crawford et al., "Bromodomain 4 activation predicts breast cancer survival," PNAS, 105(17): 6380-6385 (Apr. 2008) Published online Apr. 21, 2008.
D'Angelo et al., "Uterine sarcomas: a review," Gynecologic oncology, 116(1): 131-139 (Jan. 2010). Published online Oct. 23, 2009.
Dawson et al., "Inhibition of BET recruitment to chromatin as an effective treatment for MLL-fusion leukaemia," Nature, 478(7370): 529-533. (Oct. 2011), author manuscript as published in PubMed. Published online Oct. 2, 2011.
De Almeida et al., "Let-7 miRNA's Expression Profile and Its Potential Prognostic Role in Uterine Leiomyosarcoma," Cells, 8, 1452: 1-16 (Nov. 2019). Published online Nov. 17, 2019.
De Carvalho et al., "Treatment with epigenetic agents profoundly inhibits tumor growth in leiomyosarcoma," Oncotarget, 9(27):19379-19395 (Apr. 2018). Published online Apr. 10, 2018.
Del Gaudio et al., "BRD9 binds cell type-specific chromatin regions regulating leukemic cell survival via STAT5 inhibition," Cell Death and Disease, 10(338): 1-14 (Apr. 2019).
Dey et al., "Oncogenic KRAS-Driven Metabolic Reprogramming in Pancreatic Cancer Cells Utilizes Cytokines from the Tumor Microenvironment," Cancer Discovery, 10: 608-625 (Apr. 2020). Published online Feb. 11, 2020.

Di Giorgio et al., "Different class IIa HDACs repressive complexes regulate specific epigenetic responses related to cell survival in leiomyosarcoma cells," Nucleic Acids Research, 48(2): 646-664 (Jan. 2020). Published online Nov. 22, 2019.
Faivre et al., "Selective inhibition of the BD2 bromodomain of BET proteins in prostate cancer," Nature, 578(7794): 306-310 (Feb. 2020). Published online Jan. 22, 2020.
Felix et al., "The etiology of uterine sarcomas: a pooled analysis of the epidemiology of endometrial cancer consortium," Br. J. Cancer, 108(3): 727-734 (Feb. 2013).
Gadducci et al., "Uterine leiomyosarcoma: analysis of treatment failures and survival," Gynecologic oncology, 62(1): 25-32 (Jul. 1996).
Garcia et al., "Evaluation of Hedgehog Pathway Inhibitors as a Therapeutic Option for Uterine Leiomyosarcoma Using the Xenograft Model," Reproductive Sciences, 29: 781-790 (Mar. 2022). Published online Oct. 12, 2021.
Garcia et al., "Targeting Hedgehog Pathway and DNA Methyltransferases in Uterine Leiomyosarcoma Cells," Cells, 10(53): 1-17 (Jan. 2021). Published online Dec. 3, 2020.
Garcia et al., "The Role of Hedgehog Pathway in Female Cancers," Cancer Sci. Clin. Ther., 4(4): 487-498 (Nov. 2020), author manuscript as published in PubMed. Published online Oct. 9, 2020.
Gazon et al., "Hijacking of the AP-1 Signaling Pathway during Development of ATL," Front. Microbiol., 8: 2686, 13 pages (Jan. 2018).
Gonzalez et al., "Could miRNA Signatures be Useful for Predicting Uterine Sarcoma and Carcinosarcoma Prognosis and Treatment?," Cancers, 10(9): 315, 18 pages (Sep. 2018).
Gothe et al., "Spatial Chromosome Folding and Active Transcription Drive DNA Fragility and Formation of Oncogenic MLL Translocations," Molecular Cell, 75: 267-283 (Jul. 2019). Published online Jun. 12, 2019.
Hana et al., "Uterine sarcomas, insight into its risk factors: A systematic review," Journal of Clinical Oncology, 38 (15), abstract, (2 pages), (May 2020).
Han et al., "N-terminal kinase in rheumatoid arthritis," J. Pharmacol. Exp. Ther., 291(1): 124-30. (Oct. 1999).
Hann et al., "Role of post-translational modifications in regulating c-Myc proteolysis, transcriptional activity and biological function," Semin. Cancer Biol., 16(4): 288-302. (Aug. 2006). Published online Aug. 17, 2006.
Hasan et al., "Epigenetic signatures differentiate uterine and soft tissue Leiomyosarcoma," Oncotarget, 12(16): 1566-1579 (Aug. 2021).
Hemming, et al., "Preclinical Modeling of Leiomyosarcoma Identifies Susceptibility to Transcriptional CDK Inhibitors through Antagonism of E2F-Driven Oncogenic Gene Expression," Clinical Cancer Research, 28(11): 2397-2408 (Jun. 2022), author manuscript as published in PubMed.
Hensley et al., "Fixed-dose rate gemcitabine plus docetaxel as first-line therapy for metastatic uterine leiomyosarcoma: a Gynecologic Oncology Group phase II trial," Gynecol. Oncol., 109(3): 329-334 (Jun. 2008), author manuscript as published in PubMed.
Huang et al., "miR-140-3p functions as a tumor suppressor in squamous cell lung cancer by regulating BRD9," Cancer Lett., 446: 81-89. (Apr. 2019).
Jacomy et al., "ForceAtlas2, a Continuous Graph Layout Algorithm for Handy Network Visualization Designed for the Gephi Software," PLoS One, 9(6): 1-12 (Jun. 2014). Published online Jun. 10, 2014.
Jain et al., "Bromodomain Histone Readers and Cancer," J. Mol. Biol., 429(13): 2003-2010 (Jun. 2017).
Jones et al., "Epigenetics in carcinogenesis and cancer prevention," Ann. N.Y. Acad. Sci., 983: 213-9. (Jan. 2006).
Kanwal et al., "Epigenetics and cancer," J. Appl. Physiol., 109: 598-605 (Aug. 2010). Published online Mar. 4, 2010.
Kapoor et al., "BRD9 Inhibition by Natural Polyphenols Targets DNA Damage/Repair and Apoptosis in Human Colon Cancer Cells," Nutrients, 14(4317): 1-9 (Oct. 2022).
Karim et al., "Structural Basis of Inhibitor Selectivity in the BRD7/9 Subfamily of Bromodomains," J. Med. Chem., 63(6): 3227-3237, (Mar. 2020), author manuscript as published in PubMed.

(56) References Cited

PUBLICATIONS

Kato et al., "MYCL is a target of a BET bromodomain inhibitor, JQ1, on growth suppression efficacy in small cell lung cancer cells," Oncotarget, 7(47): 77378-77388 (Nov. 2016). Published online Oct. 14, 2016.

Kaur et al., "Targeting Chromatin Remodeling for Cancer Therapy," Current Molecular Pharmacology, 12: 215-229 (Aug. 2019).

Khare et al., "Epigenetics of colon cancer," Methods Mol Biol., 863: 177-185. (Jan. 2012). Published online Jan. 1, 2012.

Kim et al., "Epigenetics of bladder cancer," Methods Mol Biol., 863: 111-8. (Jan. 2012). Published online Jan. 1, 2012.

Kregel et al., "Functional and Mechanistic Interrogation of BET Bromodomain Degraders for the Treatment of Metastatic Castration-resistant Prostate Cancer," Clin. Cancer Res., 25(13): 4038-4048 (Jul. 2019).

Laird et al., "Cancer epigenetics," Human Molecular Genetics, 14(1): 65-76 (Apr. 2005).

Langer et al., "Jun and Fos family protein expression in human breast cancer: correlation of protein expression and clinicopathological parameters," Eur. J. Gynaecol. Oncol., 27(4): 345-352. (Jan. 2006).

Leal et al., "The Bromodomain Inhibitor, INCB057643, Targets Both Cancer Cells and the Tumor Microenvironment in Two Preclinical Models of Pancreatic Cancer," Cancers, 13(1):1-15 (Dec. 2020).

Lourenco et al., "MYC protein interactors in gene transcription and cancer," Nat Rev Cancer., 21(9): 579-591 (Sep. 2021). Published online Jun. 29, 2021.

Lu et al., "Gene Signature Associated With Bromodomain Genes Predicts the Prognosis of Kidney Renal Clear Cell Carcinoma," Front Genet., 12(643935): 1-12 (Jun. 2021).

Lucas et al., "Targeting the BET family for the treatment of leukemia," Epigenomics, 6(2): 153-155 (Apr. 2014). Published online May 9, 2014.

Magnani et al., "Genome-wide reprogramming of the chromatin landscape underlies endocrine therapy resistance in breast cancer," Proc Natl Acad Sci, 110(16): 1490-1499 (Apr. 2013).

Mason et al., "The BRD9/7 Inhibitor TP-472 Blocks Melanoma Tumor Growth by Suppressing ECM-Mediated Oncogenic Signaling and Inducing Apoptosis," Cancers (Basel), 13(21):1-19 (Nov. 2021).

Mittal et al., "Med12 gain-of-function mutation causes leiomyomas and genomic instability," The Journal of Clinical Investigation, 125(8): 3280-3284 (Aug. 2015).). Published online Jul. 20, 2015.

Moustakim et al., "Chemical probes and inhibitors of bromodomains outside the BET family," Med. Chem. Comm., 7(12): 2246-2264. (Dec. 2016) Published online Sep. 7, 2016.

Nitulescu et al., "The Akt pathway in oncology therapy and beyond (Review)." Int. J. Oncol., 53(6): 2319-2331 (Dec. 2018). Published online Oct. 16, 2018.

Park et al., "Cytotoxic activity of bromodomain inhibitor NVS-CECR2-1 on human cancer cells," Sci Rep., 10(1): 1-15 (Oct. 2020).

Qi et al., "Bromodomain and extraterminal domain inhibitors (BETi) for cancer therapy: chemical modulation of chromatin structure," Cold Spring Harbor Perspect. Biol., 6(12): 1-3 (Dec. 2014).

Qiu et al., "JQ1 suppresses tumor growth through downregulating LDHA in ovarian cancer," Oncotarget, 6(9): 6915-6930. (Mar. 2015). Published online Feb. 5, 2015.

Reynolds et al., "A View on Drug Development for Cancer Prevention," Cancer Discovery, 13(5): 1058-1083, (May 2023).

Richter et al., "Combined Inhibition of Epigenetic Readers and Transcription Initiation Targets the EWS-ETS Transcriptional Program in Ewing Sarcoma," Cancers (Basel), 12(2): 1-17(Jan. 2020).

Santillan et al., "Bromodomain and histone acetyltransferase domain specificities control mixed lineage leukemia phenotype," Cancer Res., 66(20):10032-10039. (Oct. 2006).

Schrump et al."Utilization of chromatin remodeling agents for lung cancer therapy," Cancer J., 13(1): 56-64. (Jan. 2007).

Seagle et al., "Prognosis and treatment of uterine leiomyosarcoma: A National Cancer Database study," Gynecologic oncology, 145(1): 61-70. (Apr. 2017) Published online Mar. 15, 2017.

Shi et al., "Loss of TRIM33 causes resistance to BET bromodomain inhibitors through MYC-and TGF-β-dependent mechanisms," PNAS, 113 (31): E4558-E4566, (Jul. 2016).

Shi et al., "Loss of TRIM33 casues resistance to BET bromodomain inhibitors through MYC-and TGF-β-dependent mechanisms," PNAS, 113 (31): Supporting Information, 8 pages, (Jul. 2016).

Sima et al., "The genetic alteration spectrum of the SWI/SNF complex: The oncogenic roles of BRD9 and ACTL6A," PLoS One, 14(9): e0222305 (14 pages), (Sep. 2019).

Sparic, et al., "Molecular Insights in Uterine Leiomyosarcoma: A Systematic Review," International Journal of Molecular Sciences, 23(9728): 1-14 (Aug. 2022).

Supek et al., "REVIGO summarizes and visualizes long lists of gene ontology terms.," PLoS One, 6(7): 1-9 (Jul. 2011).

The Oxford English Dictionary, definition of "prevent," [retrieved Feb. 1, 2024], (2 pages).

Tsai et al., "Histone deacetylase interacts directly with DNA topoisomerase II," Nat Genet., 26(3): 349-553. (Nov. 2000).

Tu et al., "Myc and its interactors take shape," Biochim. Biophys. Acta., 1849(5): 469-483. (May 2015). Published online Jun. 14, 2014.

Wang et al., "The Role of the Transcription Factor EGR1 in Cancer.," Front Oncol., 11(642547):1-10 (Mar. 2021).

Wong et al., "Interplay between epigenetics and metabolism in oncogenesis: mechanisms and therapeutic approaches," Oncogene, 36(24):3359-3374. (Jan. 2017).

Xie et al., "Gene Set Knowledge Discovery with Enrichr," Curr. Protoc., 1(3): 1-84 (Mar. 2021), author manuscript as published in PubMed.

Yamaguchi et al., "Case of leiomyosarcoma arising from subserosal leiomyoma," J. Obstet. Gynaecol. Res., 45(9): 1944-7. (Jun. 2019).

Yang et al., "Comprehensive Review of Uterine Fibroids: Developmental Origin, Pathogenesis, and Treatment," Endocrine Reviews, 43(4):678-719 (Nov. 2021).

Yang et al., "Altered DNA repair genes in human uterine fibroids are epigenetically regulated via EZH2 histone methyltransferase," Fertility and Sterility, 104(3): Supplement E72 (Oct. 2015).

Yang et al., "Epigenetic alterations differ in phenotypically distinct human neuroblastoma cell lines," BMC Cancer, 10(286): 1-10 (Jun. 2010).

Yang et al., "Association of epigenetic inactivation of RASSF1A with poor outcome in human neuroblastoma," Clin Cancer Res., 10(24): 8493-8500. (Dec. 2004).

Yang et al., "Methylation-associated silencing of the thrombospondin-1 gene in human neuroblastoma," Cancer Res., 63(19):6299-310. (Oct. 2003).

Yang et al., "Bromodomain-Containing 9 Regulates Signaling Pathways and Reprograms the Epigenome in Immortalized Human Uterine Fibroid Cells," International Journal of Molecular Sciences, 25(95): 1-21 (Jan. 2024).

Ying et al., "CDK1 serves as a novel therapeutic target for endometrioid endometrial cancer," J Cancer, 12(8): 2206-2215 (Feb. 2021) Published online Feb. 22, 2021.

Zhang et al., "Aberrant activation of m6A demethylase FTO renders HIF2alpha(low/-) clear cell renal cell carcinoma sensitive to BRD9 inhibitors," Sci Transl. Med., 13(613): 1-15 (Sep. 2021).

Zhang et al., "The aberrant upstream pathway regulations of CDK1 protein were implicated in the proliferation and apoptosis of ovarian cancer cells," J. Ovarian Res., 10(1): 1-11 (Sep. 2017).

Zhao et al., "Investigating crosstalk between H3K27 acetylation and H3K4 trimethylation in CRISPR/dCas-based epigenome editing and gene activation," Sci Rep., 11(1):1-11 (Aug. 2021).

Zhu et al., "Targeting BRD9 for Cancer Treatment: A New Strategy," Onco. Targets Ther., 13: 13191-13200. (Dec. 2020).

Zuccala et al., Misdirecting methylation to drive oncogenesis, Nat. Rev. Cancer, 16(7): 410 (Jun. 2016).

Aicher et al., "Serum response elements activate and cAMP responsive elements inhibit expression of transcription factor Egr-1 in

(56) References Cited

PUBLICATIONS synovial fibroblasts of rheumatoid arthritis patients," International Immunology, 11(1): 47-61 (Sep. 1998) Published online Jan. 1, 1999.

Ali et al., "Activation of β-Catenin Signaling and its Crosstalk With Estrogen and Histone Deacetylases in Human Uterine Fibroids," J Clin Endocrinol. Metab., 105(4): e1517-e1535 (Apr. 2020). Published online Dec. 25, 2019.

Archer et al., "Proteomics, Post-translational Modifications, and Integrative Analyses Reveal Molecular Heterogeneity within Medulloblastoma Subgroups," Cancer Cell, 34: 396-410 and e1-e8 (Sep. 2018).

Belkina et al., "BET Protein Function Is Required for Inflammation: Brd2 Genetic Disruption and BET Inhibitor JQ1 Impair Mouse Macrophage Inflammatory Responses," J Immunol., 190(7): 3670-3678 (Apr. 2013).

Bell et al., "PIK3CA Cooperates with KRAS to Promote MYC Activity and Tumorigenesis via the Bromodomain Protein BRD9," Cancers, 11(11): 1634, 20 pages (Oct. 2019).

Bertsch et al., "MED12 and HMGA2 mutations: two independent genetic events in uterine leiomyoma and leiomyosarcoma," Modern Pathology, 27: 1144-1153 (2014)). Published online Jan. 3, 2014.

Bhargava et al., "IGF2 mRNA binding protein 3 (IMP3) mediated regulation of transcriptome and translatome in glioma cells," Cancer Biology & Therapy, 19(1): 42-52 (Jan. 2018). Published online Dec. 19, 2017.

Bulavin et al., "Loss of Oncogenic H-ras-Induced Cell Cycle Arrest and p38 Mitogen-Activated Protein Kinase Activation by Disruption of Gadd45a," Molecular And Cellular Biology, 23(11): 3859-3871 (Jun. 2003). Published online Mar. 27, 2023.

Carbajo-Garcia, et al., "Integrative analysis of the DNA methylome and transcriptome in uterine leiomyoma shows altered regulation of genes involved in metabolism, proliferation, extracellular matrix, and vesicles," Journal of Pathology, 257: 663-673 (Aug. 2022). Published online Jun. 13, 2022.

Care et al., "Parsimonious Gene Correlation Network Analysis (PGCNA): a tool to define modular gene co-expression for refined molecular stratification in cancer," Systems Biology and Applications, 5(13): 1-17 (Apr. 2019).

Chen et al., "Topoisomerase IIα in Chromosome Instability and Personalized Cancer Therapy," Oncogene, 34(31): 4019-4031 (Jul. 2015), author manuscript as published in PubMed.

Chinenov et al., "Fos-Jun interactions that mediate transcription regulatory specificity," Oncogene, 20(19): 2438-2452. (Apr. 2001).

Choi et al., "Integrated mutational landscape analysis of uterine leiomyosarcomas," PNAS, 118(15): e2025182118, Supplemental Data 14, 2 pages (Apr. 2021).

Choi et al., "Integrated mutational landscape analysis of uterine leiomyosarcomas," PNAS, 118(15): e2025182118, Supplemental Data 15, 2 pages (Apr. 2021).

* cited by examiner

I-BRD9

TP-472

(+)-JQ1

I-BET762

PFI 1

CPI 203

STM2457

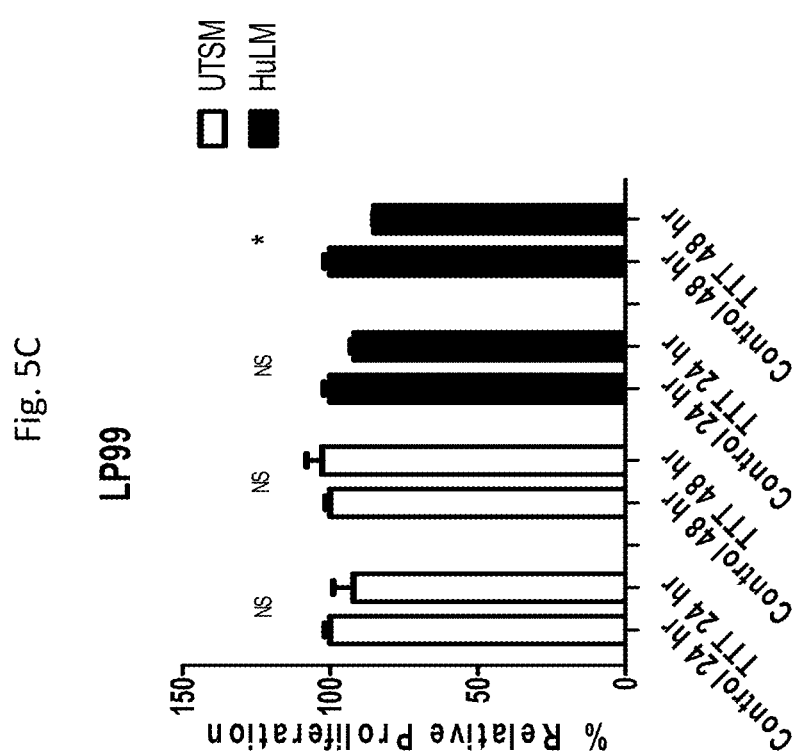

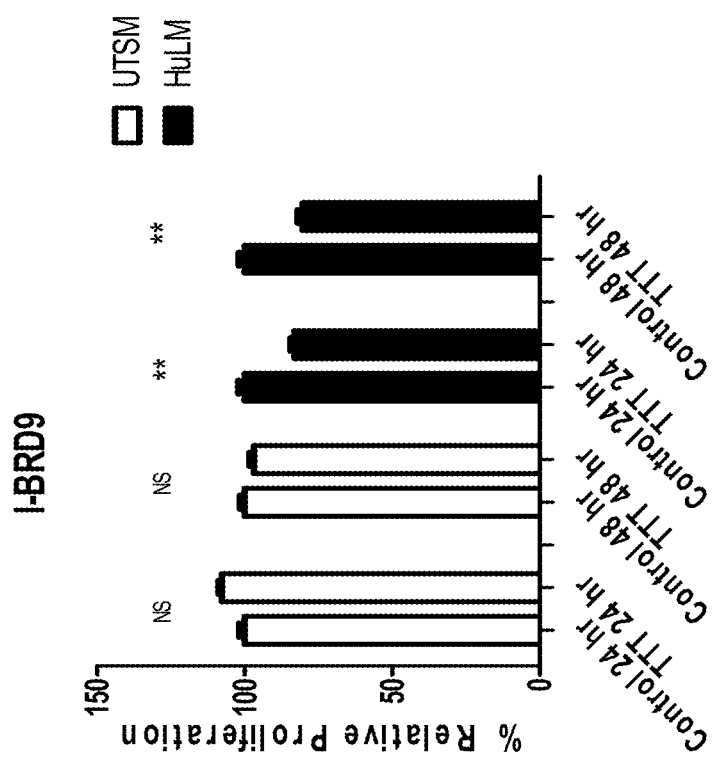

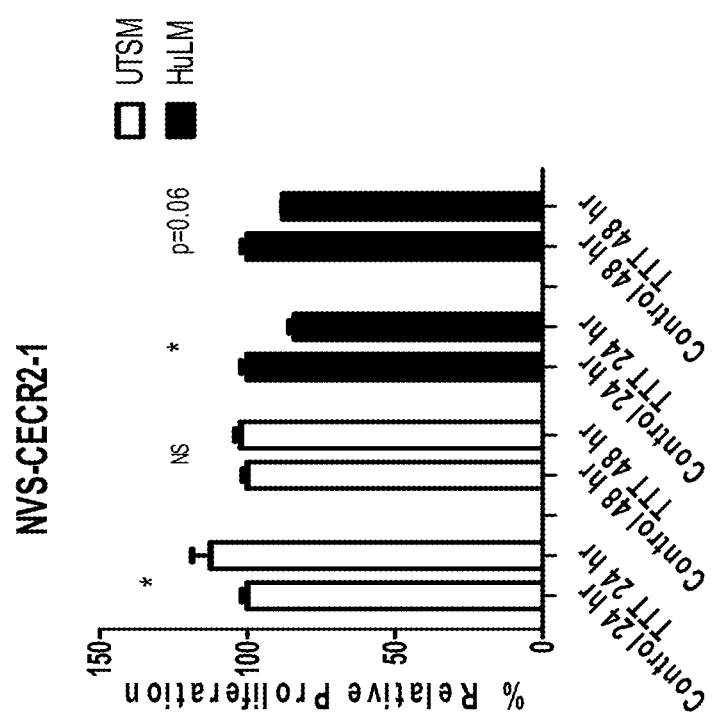

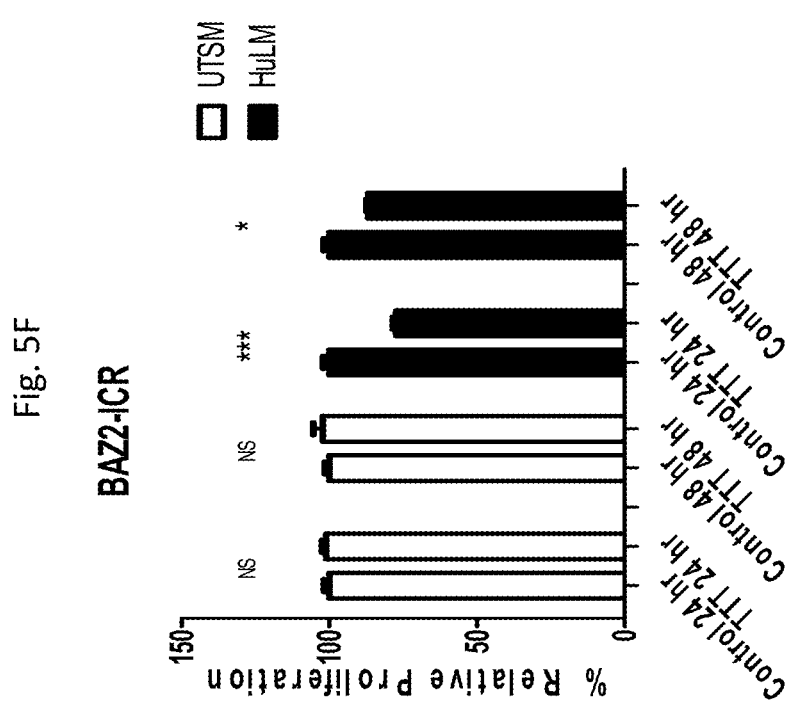

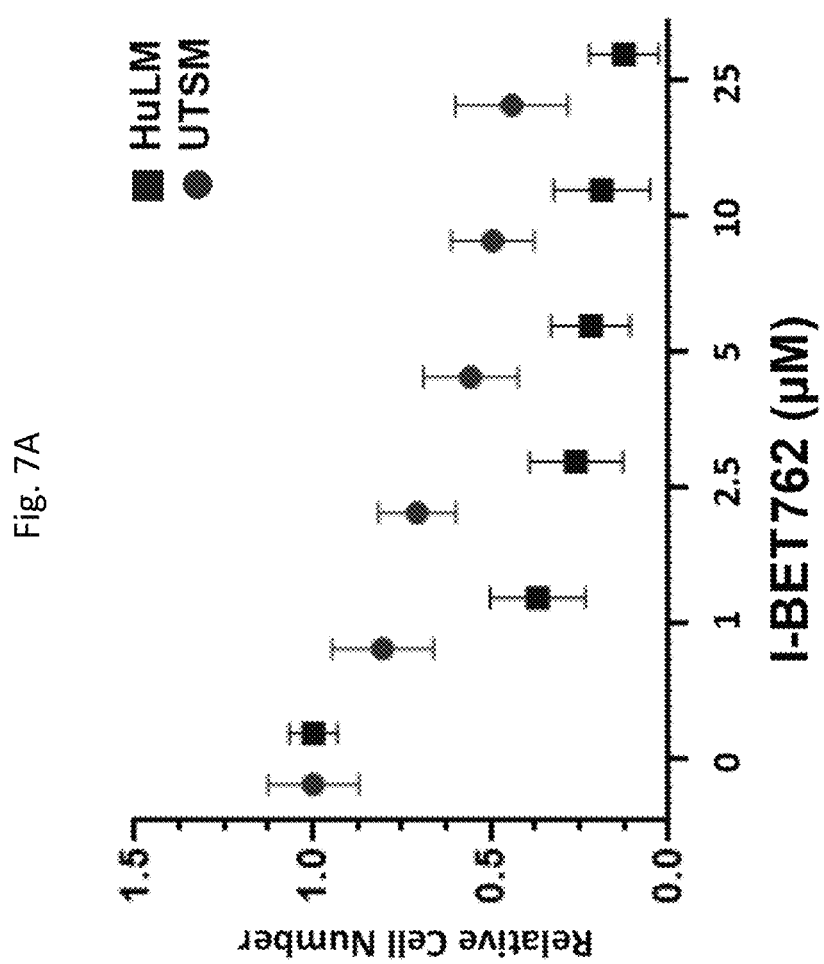

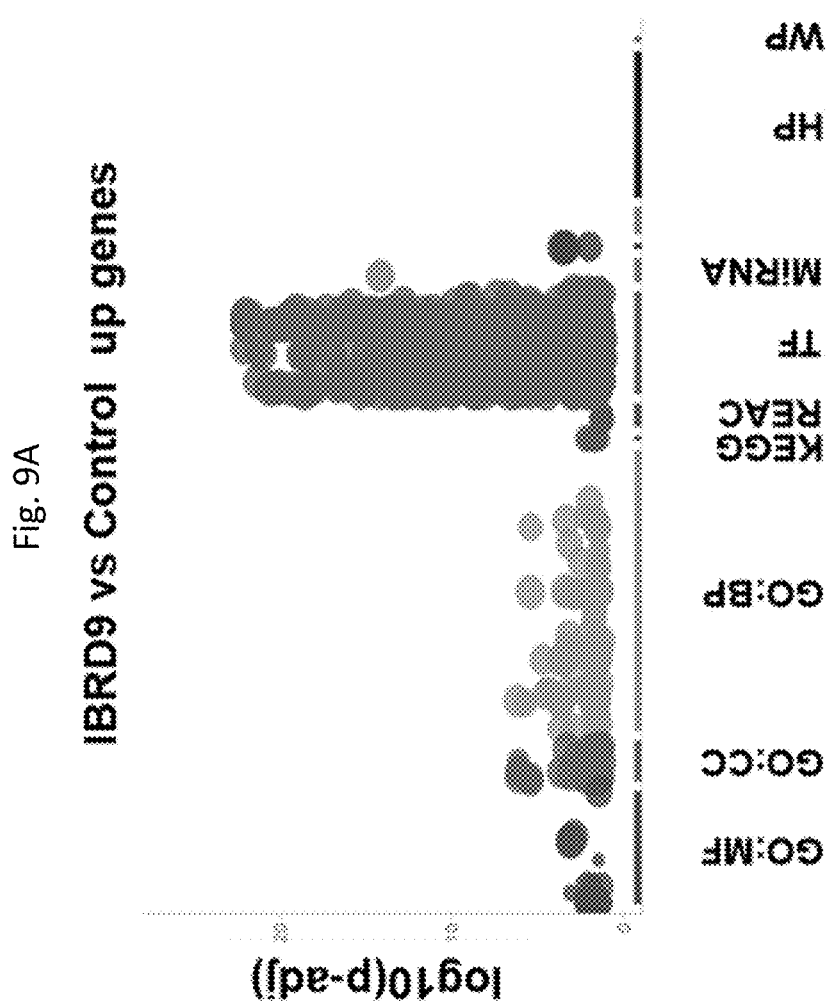

INHIBITION OF BRD PROTEINS SUPPRESSES THE PHENOTYPE OF UTERINE FIBROIDS

CROSS-REFERENCE TO RELATED APPLICATION

This patent application claims the benefit of U.S. Provisional Patent Application No. 63/256,855, filed Oct. 18, 2021, which is incorporated by reference herein in its entirety.

STATEMENT REGARDING FEDERALLY SPONSORED RESEARCH OR DEVELOPMENT

This invention was made with Government support under Grant Numbers HD106285 awarded by the National Institutes of Health. The Government has certain rights in this invention.

BACKGROUND

Uterine fibroids (UFs) are benign smooth muscle tumors that are a major cause of gynecologic dysfunction, such as menometrorrhagia and anemia, pelvic pressure and bulk symptoms, infertility, recurrent miscarriage, and preterm labor. UFs are the most common pelvic tumor, occurring in 80% of women. Uterine fibroids exhibit an extraordinary range of clinical presentations with lesions that routinely range from 5 mm to over 25 cm in size.

There is an ongoing need in the art to treat UFs.

BRIEF SUMMARY

In aspects, the present disclosure provides a method of treating or preventing a uterine fibroid in a female mammal, the method comprising, consisting essentially of, or consisting of administering to the female mammal an effective amount of an inhibitor of bromodomain (BRD) protein.

Additional aspects of the present disclosure are as described herein.

BRIEF DESCRIPTION OF THE DRAWINGS

FIGS. 5A-5F are cell proliferation assay bar graphs showing the percent of relative proliferation in an immortalized human leiomyoma cell line (HuLM) and immortalized human uterine smooth muscle cell line (UTSM) that have been cultured for 24 or 48 hours in the presence or absence of the BRD inhibitors: TP-472 (FIG. 5A), OF-1 (FIG. 5B), LP99 (FIG. 5C), I-BRD9 (FIG. 5D), NVS-CECR2-1 (FIG. 5E), and BAZ2-ICR (FIG. 5F). NS, *, , and *indicate, not significant, p<0.05, <0.01, and <0.001 respectively.

FIGS. 7A-7B are cell proliferation assay scatter plot graphs showing the relative cell number of HuLM (square) and UTSM (circle) cells after treatment with 0-25 µM of I-BET762 (FIG. 7A) or (+)-JQ1 (FIG. 7B) for 48 hours.

FIGS. 9A-9D are dot plot graphs of RNA-sequencing analysis showing gene groups that are upregulated (FIG. 9A) and downregulated (FIG. 9B) in HuLM cells cultured in the presence or absence of I-BRD9 and dot plot graphs of RNA-sequencing analysis showing gene groups that are upregulated (FIG. 9C) and downregulated (FIG. 9D) in HuLM cells cultured in the presence or absence of TP-472. GO: gene ontology, BP: biological process, CC: cellular component, MF: molecular function, CORUM: comprehensive resource of mammalian protein complexes, HPA: human protein atlas, HP: human phenotype ontology, WP: wikipathway.

DETAILED DESCRIPTION

Figure 1:
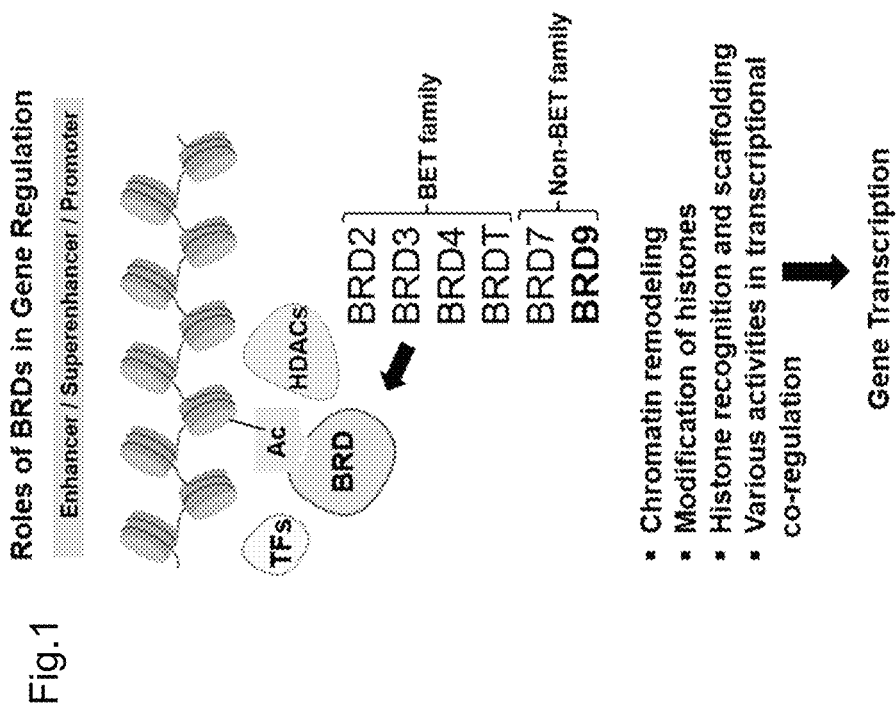
FIG. 1 is a diagram that illustrates bromodomain (BRD) proteins in gene regulation.

In aspects, the present disclosure provides a method of treating or preventing a uterine fibroid in a female mammal, the method comprising, consisting essentially of, or consisting of administering to the female mammal an effective amount of an inhibitor of bromodomain (BRD) protein. In aspects the female mammal is a human.

As used herein, a "uterine fibroid" (UF), is a benign tumor of the uterus that consists of a mass or population of smooth muscle cells and connective tissue that grows, usually slowly, within the uterine wall. Epidemiologic studies demonstrate that UFs, also known as leiomyomas, initially form after menarche. It is suspected that fibroid growth is due to a monoclonal, deregulated proliferation of uterine smooth muscle myometrial cells. The primary tumor cell type resulting from the growth of the fibroid are derived from myometrial cells.

UFs have a high accumulative incidence. UFs are one of the most common tumors. Complications arising from uterine fibroids account for approximately a third of all hysterectomies performed in the U.S., and are associated with high morbidity from uterine bleeding and pain. By age 50 approximately 75% of women have developed UFs. A significant number of those with UFs suffer from debilitating pelvic pain, heavy and prolonged bleeding, which may lead to anemia and iron deficiency, bowel and bladder dysfunction, and infertility. UFs also cause symptoms such as low back pain, urinary frequency and urgency, pain during intercourse (dyspareunia), can cause pre-term labor, and have a negative impact on fertility (due to cavity distension, and alteration of endometrial receptivity and sexual function).

The terms "treat," "treating," "treatment," "therapeutically effective," etc. used herein do not necessarily imply 100% or complete treatment, etc. Rather, there are varying degrees, which one of ordinary skill in the art recognizes as having a potential benefit or therapeutic effect. In this respect, the inhibitor of BRD and methods can provide any amount of any level of treatment. Furthermore, the treatment provided by the disclosed method can include the treatment of one or more conditions or symptoms of the disease or condition being treated.

The disclosed methods comprise using an effective amount of an inhibitor of BRD. An "effective amount" means an amount sufficient to show a meaningful benefit. A meaningful benefit includes, for example, detectably treating, relieving, or lessening one or more symptoms of UFs; inhibiting, arresting development, preventing, or halting further development of UFs; reducing the size and/or mass of UFs; reducing the severity of UFs; preventing UFs from occurring in a subject at risk thereof but yet to be diagnosed. The meaningful benefit observed can be to any suitable degree (10%, 20%, 30%, 40%, 50%, 60%, 70%, 80%, 90% or more). In aspects, one or more symptoms are prevented, reduced, halted, or eliminated subsequent to administration of an inhibitor of BRD as described herein, thereby effectively treating the disease to at least some degree.

One skilled in the art will recognize that dosage will depend upon a variety of factors, including the age, condition or disease state, predisposition to disease, genetic defect or defects, and body weight of the subject. The size of the dose will also be determined by the route, timing and frequency of administration as well as the existence, nature, and extent of any adverse side-effects that might accompany the administration of a particular active agent and the desired effect. It will be appreciated by one of skill in the art that various conditions or disease states may require prolonged treatment involving multiple administrations.

The amount (e.g., therapeutically effective amount) of an inhibitor of BRD suitable for administration depends on, e.g., the particular route of administration and the weight of the mammal to be treated. Several doses can be provided over a period of days or weeks.

The mammal may be any suitable mammal. Mammals include, but are not limited to, the order Rodentia, such as mice, and the order Lagomorpha, such as rabbits. The mammal can be from the order Carnivora, including Felines (cats) and Canines (dogs). The mammal can be from the order Artiodactyla, including Bovines (cows) and Swines (pigs) or of the order Perissodactyla, including Equines (horses). The mammal can be of the order Primates, Cebids, or Simioids (monkeys) or of the order Anthropoids (humans and apes). In aspects, the mammal is human.

In aspects the method of treating a uterine fibroid in a female mammal, including humans, comprises administering an effective amount of TP-472. The amount (e.g., therapeutically effective amount) of TP-472 suitable for administration depends on, e.g., the particular route of administration and the weight of the mammal to be treated. Several doses can be provided over a period of days or weeks.

In aspects, the method of treating a uterine fibroid in a female mammal, including humans, comprises administering an effective amount of I-BRD9. The amount (e.g., therapeutically effective amount) of I-BRD9 suitable for administration depends on, e.g., the particular route of administration and the weight of the mammal to be treated. Several doses can be provided over a period of days or weeks.

In aspects the method of treating a uterine fibroid in a female mammal, including humans, comprises administering an effective amount of JQ1. The amount (e.g., therapeutically effective amount) of JQ1 suitable for administration depends on, e.g., the particular route of administration and the weight of the mammal to be treated. Several doses can be provided over a period of days or weeks.

In aspects the method of treating a uterine fibroid in a female mammal, including humans, comprises administering an effective amount of I-BET762. The amount (e.g., therapeutically effective amount) of I-BET762 suitable for administration depends on, e.g., the particular route of administration and the weight of the mammal to be treated. Several doses can be provided over a period of days or weeks.

Bromodomain containing (BRD) proteins are involved in many biological processes, most notably epigenetic regulation of transcription, and BRD protein dysfunction has been linked to many diseases including tumorigenesis. BRD proteins have been split into the bromodomain proteins and bromodomain and extraterminal (BET) proteins. The bromodomain, acting as the "readers" of lysine acetylation, is responsible for transducing the signal carried by acetylated lysine residues and translating it into various normal phenotype.

Figure 2:
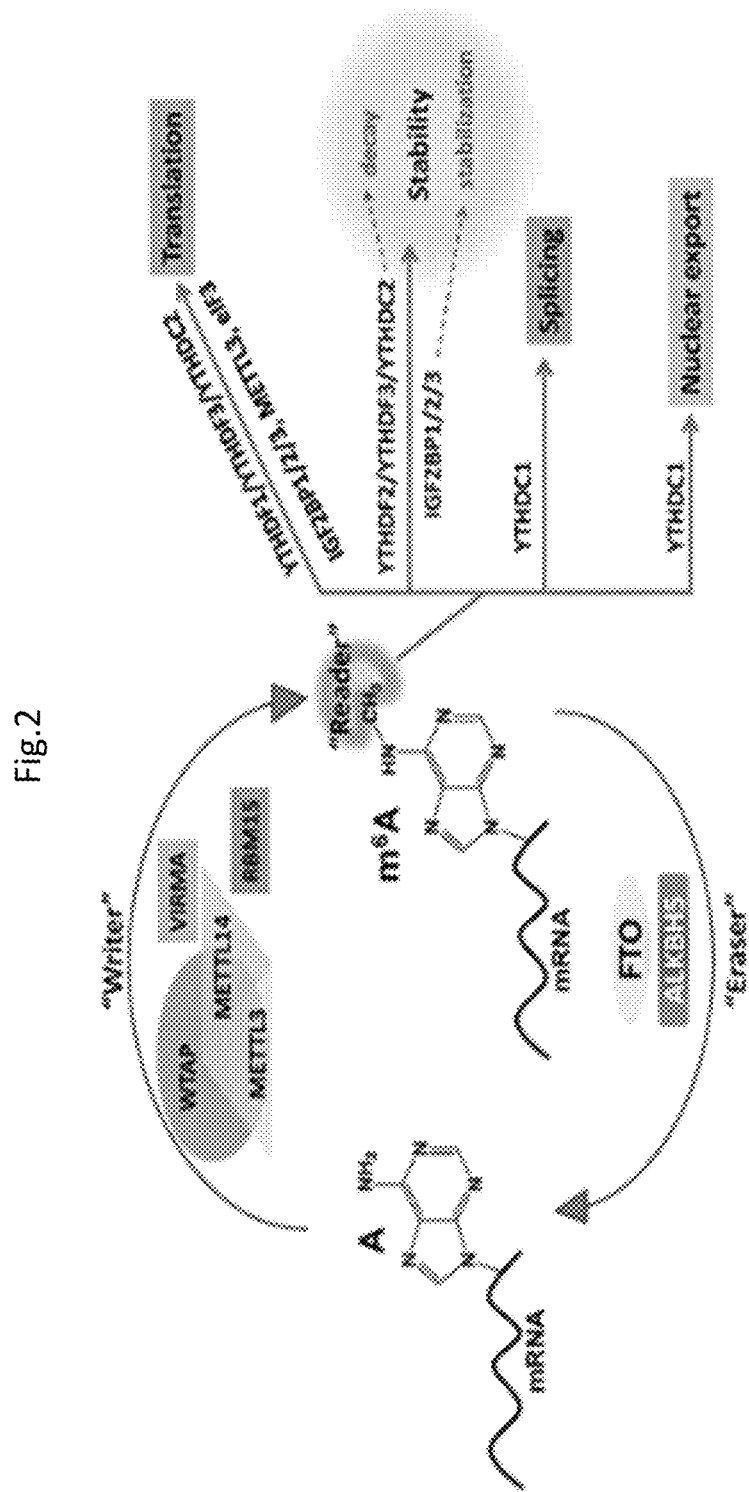
FIG. 2 is a diagram that illustrates the N6-methyladenosine (m6A) pathway in the epitranscriptome.

The epitranscriptome includes all the biochemical modifications of the RNA within a cell. Among these post-transcriptional RNA modifications, m6A is the abundant, dynamic, and reversible modification involved in many biological events and diseases. FIG. 2 summarizes some of the roles of m6A regulators in the epitranscriptome.

As used herein, the term "m6A regulator" is any molecule that regulates m6A modifications to RNA. Without wishing to be bound by theory, m6A regulators can be further categorized as "erasers," "readers," and "writers." As used herein, an "eraser" is defined as a category of enzymes that demethylate m6A. m6A erasers include fat mass and obesity-associated protein (FTO) and human AlkB homolog 5 (ALKBH5). As used herein, a "reader" is defined as a protein that recognizes and binds to m6A. m6A readers include YT521-B homology domain containing proteins (YTHDC) such as YTHDC1 and YTHDC2, YT521-B homology domain N6-methyladenosine RNA binding proteins (YTHDF) such as YTHDF1, YTHDF2, and YTHDF3, eukaryotic initiation factor 3 (eIF3), fragile X messenger riboprotein 1 (FMR1), heterogeneous nuclear ribonucleoproteins (HNRNPs) such as HNRNPC, HNRNPG, and HNRNPA2B1, and insulin-like growth factor 2 mRNA-binding proteins (IGF2BP) such as IGF2BP1, IGF2BP2, and IGF2BP3. As used herein, a "writer" is defined as an m6A methyltransferase complex that post-transcriptionally adds the m6A mark. The m6A methyltransferase complex includes core subunits such as methyltransferase-like 3 (METTL3), which catalyzes the methyl transfer, and methyltransferase-like 14 (METTL14), which also methylates adenosine residues at the N(6) position of some mRNAs.

The m6A methyltransferase complex also includes adaptor subunits such as RNA binding motif protein 15 (RBM15), Wilms' tumor 1-associating protein (WTAP), vir-like m6A methyltransferase associated (VIRMA), E3 ubiquitin-protein ligase Hakai (HAKAI), also known as, casitas B-lineage lymphoma-transforming sequence-like protein 1 (CBLL1), and zinc finger CCCH-type containing protein 13 (ZC3H13). These adaptors play an important role in targeting the "writers" to distinct sets of genes in the chromatin, resulting in transcript-specific m6A methylation.

BRD proteins can have a wide variety of functions via multiple gene regulation mechanisms including chromatin remodeling, modifications of histones, histone recognition and scaffolding, and various activities in transcriptional co-regulation, as shown in FIG. 1. BRD proteins are involved in many diseases, including inflammation, metabolic diseases, multiple sclerosis, cardiovascular disease, and tumorigenesis. Several small molecular inhibitors of BRD proteins have previously been developed.

TP-472, I-BRD9, (+)-JQ1, and I-BET762 are BRD inhibitors. As used herein, a "BRD inhibitor" is any agent that inhibits a BRD protein, e.g., by inhibiting the expression or function of a BRD protein. Examples of BRD inhibitors include TP-472, BAY-299, PFI-1, (+)-JQ1, bromosporine, GSK2801, OF-1, BAZ2-ICR, LP99, NI-57, PFI-4, I-BRD9, I-BET672, BI-9564, and NVS-CECR2-1.

The following includes certain aspects of the disclosure.

1. A method of treating or preventing a uterine fibroid in a female mammal, the method comprising administering to the female mammal an effective amount of an inhibitor of bromodomain protein (BRD).

2. The method of aspect 1, wherein the inhibitor of BRD is TP-472, I-BRD9, JQ1, or I-BET762.

3. The method of aspect 2, wherein the inhibitor of BRD is TP-472.

4. The method of aspect 1, wherein the female mammal is a human.

5. The method of aspect 2, wherein the female mammal is a human.

6. The method of aspect 3, wherein the female mammal is a human.

It shall be noted that the preceding are merely examples of aspects of the disclosure. Other exemplary aspects are apparent from the entirety of the description herein. It will also be understood by one of ordinary skill in the art that each of these aspects may be used in various combinations with the other aspects provided herein.

The following examples further illustrate aspects of the disclosure, but, of course, should not be construed as in any way limiting its scope.

EXAMPLE

This example demonstrates dysregulation of BRD proteins in human UFs compared to myometrium and demonstrates inhibition of BRD9.
Materials and Methods
UF Tissue Sample Collection The UF tissues were obtained from the University of Chicago Tissue Bank. Approval from the Institutional Review Board (#20-1414) at the University of Chicago was obtained for the retrospective chart review of UF patients. Informed consent was obtained from all the patients participating in the study before surgery. The cases with an initial diagnosis of UF at University of Chicago Hospital were reviewed, and the diagnosis was confirmed by H&E evaluation and immunohistochemistry. A total of nine cases with UFs were used and human UFs (n=22) and matched myometrium tissue (n=7) were collected at the time of the hysterectomy.
Western Immunoblot Cells were collected and lysed in RIPA lysis buffer with protease and phosphatase inhibitor cocktail (Thermo Scientific, Waltham, MA, USA), and the protein was quantified using the Bradford method (Bio-Rad Protein Assay kit). The antibodies used were: METTL3 (ab195352, Abcam), YTHDC1 (ab122340, Abcam), YTHDC2 (35440, Cell Signaling), YTHDF2 (ab220163, Abcam), BCL-2 (ab182858, Abcam), FN (26836, Cell Signaling), PCNA (GTX100539, Genetex), BRD2 (5848, cell signaling), BRD3 (ab50818, Abcam), BRD9 (58906, Cell Signaling). The antigen-antibody complex was detected with Trident Femto Western HRP substrate (GeneTex, Irvine, CA, USA). Specific protein bands were visualized using ChemiDoc XRS þ molecular imager (Bio-Rad, Hercules, CA, USA).
Cell Culture The immortalized human leiomyoma cell line (HuLM) and immortalized human uterine smooth muscle (UTSM) cells were cultured and maintained in phenol red-free, Dulbecco's Modified Eagle Medium: Nutrient Mixture F-12. The cells were grown at 37° C. and 5% $CO_2$ in an incubator with saturating humidity.
BRD Inhibitor Screening by MTT Assay Cell proliferation was measured using a 3-(4,5-dimethylthiazol-2-yl)-2,5-diphenyltetrazolium bromide (MTT) assay. $2\times10^4$ UTSM or HuLM cells per well were seeded into 12-well tissue culture plates in the absence or presence of each BRD inhibitor from Table 1 for 24 hours or 48 hours. The inhibitors used in this assay were from the Epigenetic Library at the University of Illinois at Chicago. This assay was performed three times in triplicate.

TABLE 1

| BRD Inhibitor | Target | Notes |
| --- | --- | --- |
| TP-472 | BRD9/7 | bromodomain |
| BAY-299 | BRD1, TAF1 | bromodomain |
| PFI-1 | BET family | bromodomain |
| (+)-JQ1 | BET family | bromodomain |
| bromosporine | broad spectrum bromodomain | bromodomain |
| GSK2801 | BAZ2A/2B | bromodomain, zn finger |
| OF-1 | BRPF1B/2/3 | chromatin regulator (PHD, bromodomains) |
| BAZ2-ICR | BAZ2A/2B | bromodomain, zn finger |
| LP99 | BRD9/7 | bromodomain |
| NI-57 | BRPF1B/2/3 | chromatin regulator (PHD, bromodomains) |
| PFI-4 | BRPF1B | chromatin regulator (PHD, bromodomains) |
| I-BRD9 | BRD9 | bromodomain |
| BI-9564 | BRD9/7 | bromodomain |
| NVS-CECR2-1 | CECR2 | chromatin remodeling (bromodomain) |

BRD Inhibition Treatments

HuLM cells were cultured in phenol red-free, 10% fetal bovine serum Dulbecco's Modified Eagle Medium: Nutrient Mixture F-12 at 37° C., 5% $CO_2$ in the absence or presence of the BRD inhibitors I-BRD9 and TP-472 for 48 hours respectively. The concentrations of both inhibitors were used in the range of 0-25 μM. Cells were collected after treatment for Western immunoblot as described above.
Microscopy HuLM cells were imaged using (microscope and imaging software).

Cell Proliferation Assay of BRD Inhibition

Cell proliferation was measured using trypan blue exclusion assay. UTSM and HuLM cells ($2\times10^4$ cells per well) were seeded into 12-well tissue culture plates. After 24 hours the cells were cultured in the absence or presence of the BRD inhibitor I-BET762 or (+)-JQ1 at a dose range from 1-25 µM for 48 hours. DMSO was used as a vehicle control. Cells were trypsinized, collected by centrifuge, and resuspended in serum-free medium. Equal volumes of 0.4% trypan blue and cell suspension were mixed and cells were counted using a hemacytometer.

Statistical Analysis of Immunoblots and Proliferation Assays

Comparisons between groups were made using student t-tests. In figures, NS, *,, and *indicate, not significant, p<0.05, <0.01, and <0.001 respectively.

RNA-Sequencing

To determine the mechanism underlying the inhibitory effect of BRD9 inhibition on the UFs, the HuLM cells were treated with BRD9 inhibitor I-BRD9 (5 µM, n=4), TP-472 (5 µM, n=3), and DMSO vehicle control (n=4) for 48 hr. RNA was isolated using Trizol. RNA quality and quantity were assessed using the Agilent bio-analyzer. Strand-specific RNA-SEQ libraries were prepared using a TruSEQ total RNA-SEQ library protocol (Illumina provided). Library quality and quantity were assessed using the Agilent bio-analyzer and libraries were sequenced using an Illumina NovaSEQ6000 (illumine provided reagents and protocols).

Transcriptome Data Analysis

A variety of R packages was used for this analysis. All graphics and data wrangling were handled using the tidyverse suite of packages (available from tidyverse.org). All packages used are available from the Comprehensive R Archive Network (CRAN), Bioconductor.org, or GitHub. The reads were mapped to the human reference transcriptome using STAR, version 2.6.1d, as previously described (Dobin et al., Bioinformatics 29 (1):15-21 (2013)). The quality of raw reads, as well as the results of STAR mapping, are generated using fastqc (available from bioinformatics.babraham.ac.uk/projects/fastqc/) and multiqc (available from multiqc.info). Raw reads were mapped to the human reference transcriptome using Salmon, version 1.4.0 (available from combine-lab.github.io/salmon/). After reading mapping with Salmon, Bioconductor (available from bioconductor.org/packages/release/bioc/html/tximport) was used to read Salmon outputs into the R environment. Annotation data from Gencode V34 was used to summarize data from transcript-level to gene-level.

Results

BRD Protein Expression in Human UF Cells

Figure 3A:
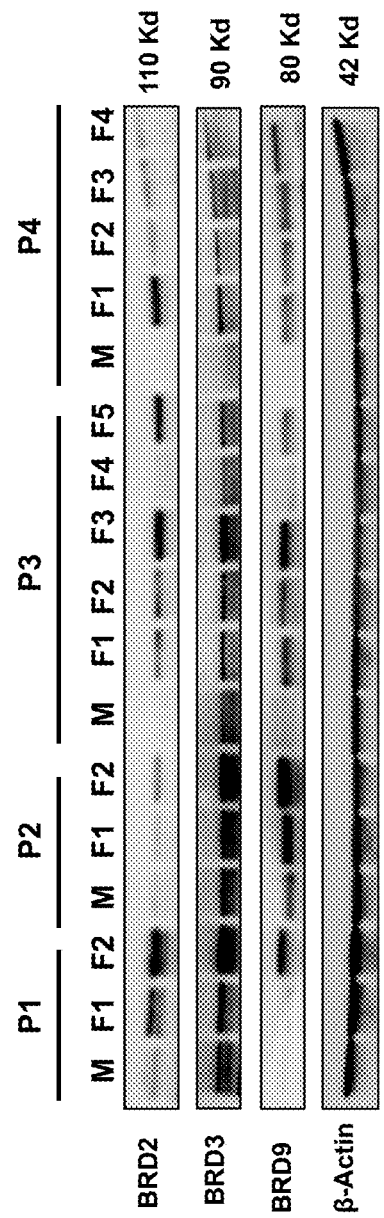
FIGS. 3A-3C are a Western blot image of BRD2, BRD3, BRD9, and β actin levels in UFs and myometrium from uterus (MyoF) of humans (FIGS. 3A-B) and an immunoblot analysis dot graph of the fold change in UF over MyoF of BRD2, BRD3, and BRD9 levels (FIG. 2B). P indicates the patient (n=7), M indicates the MyoF tissue (n=7), F indicates the UFs (n=22).
Figure 3B:
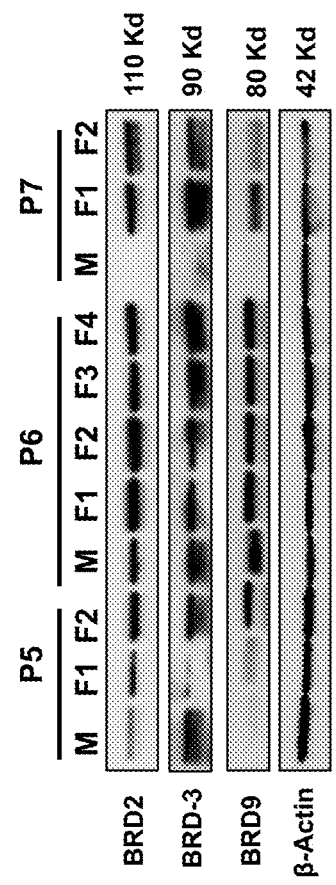
Figure 3C:
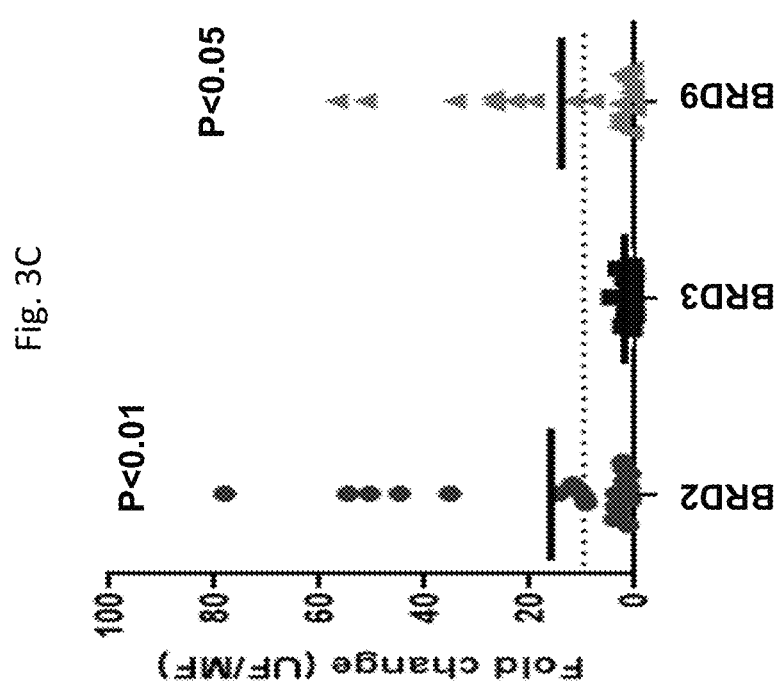
Figure 4B:
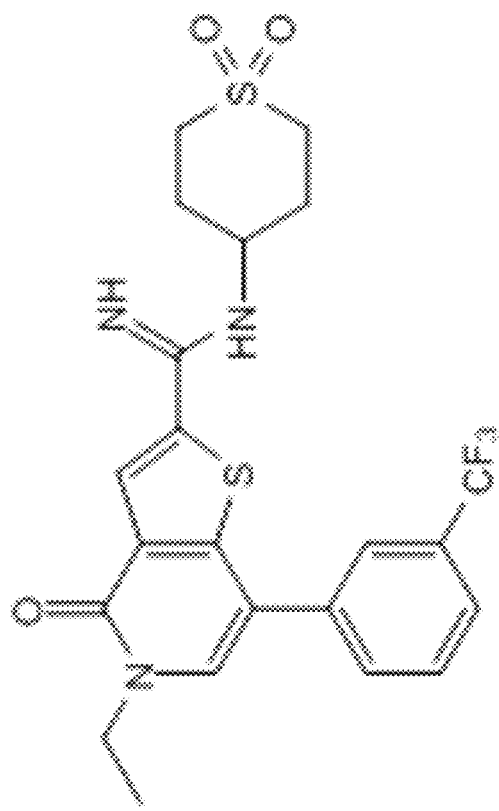
FIGS. 4A-4G are illustrations of the chemical structure of the BRD inhibitors TP-472 (FIG. 4A), I-BRD9 (FIG. 4B), I-BET762 (FIG. 4C), (+)-JQ1 (FIG. 4D), PFI 1 (FIG. 4E), CPI 203 (FIG. 4F), and STM2457 (FIG. 4G).
Figure 4A:
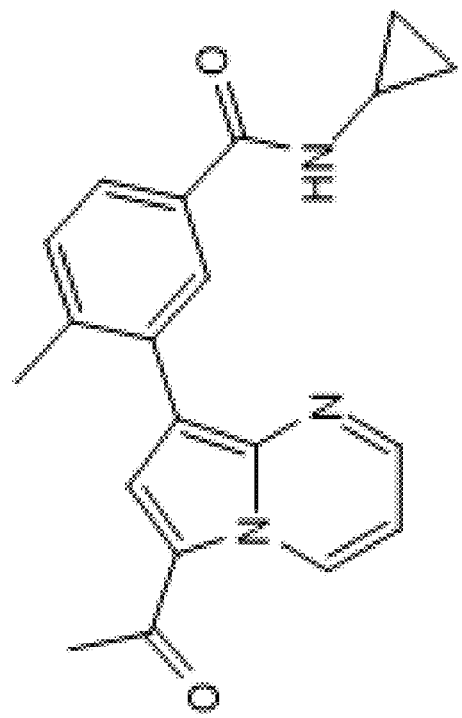
Figure 4D:
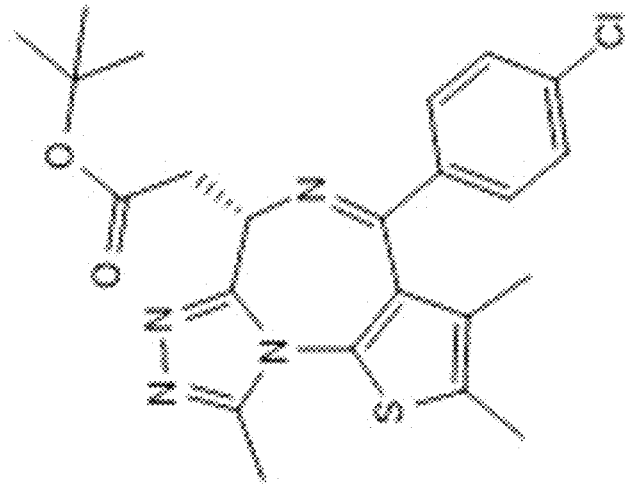
Figure 4C:
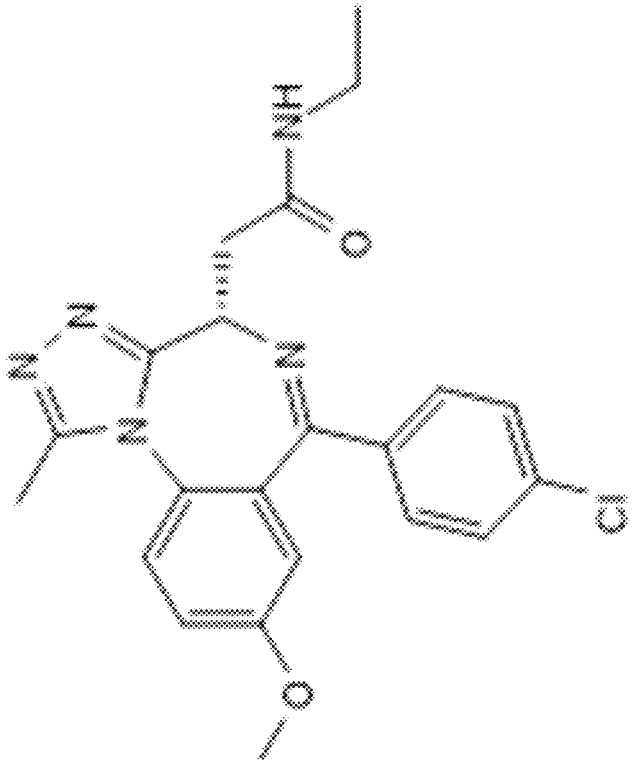
Figure 4E:
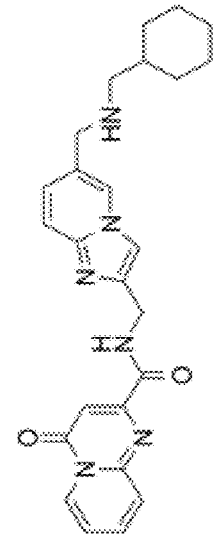
Figure 4F:
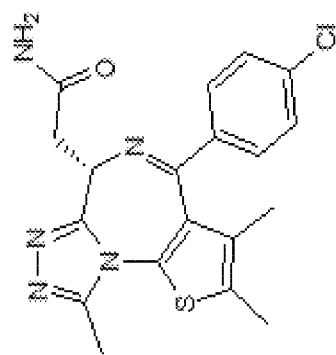
Figure 4G:
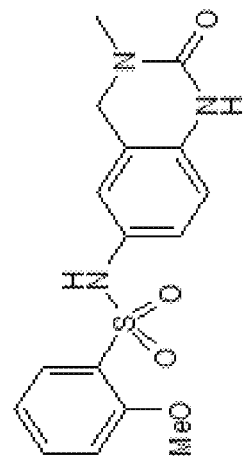

Human UFs (n=22) and matched MyoF tissue (n=7) were collected at the time of hysterectomy from seven patients. Immunoblot analysis was performed on human uterine fibroids (n=22) and matching myometrium tissue (n=7) to determine the levels of the BRD proteins, BRD2, BRD3, and BRD9 (FIGS. 3A-B). The protein levels of BRD2 and BRD9, but not BRD3, were significantly upregulated in UFs compared to matched myometrium tissues (FIG. 3C). Among 22 UFs analyzed, 96% (21/22, p<0.01), 55% (12/22), 82% (18/22, p<0.01) exhibited the upregulation of BRD2, BRD3, and BRD9 respectively, suggesting that aberrant BRD protein expression may contribute to the pathogenesis of UFs.

Screening of BRD Inhibitors in UF Cells

Figure 5A:
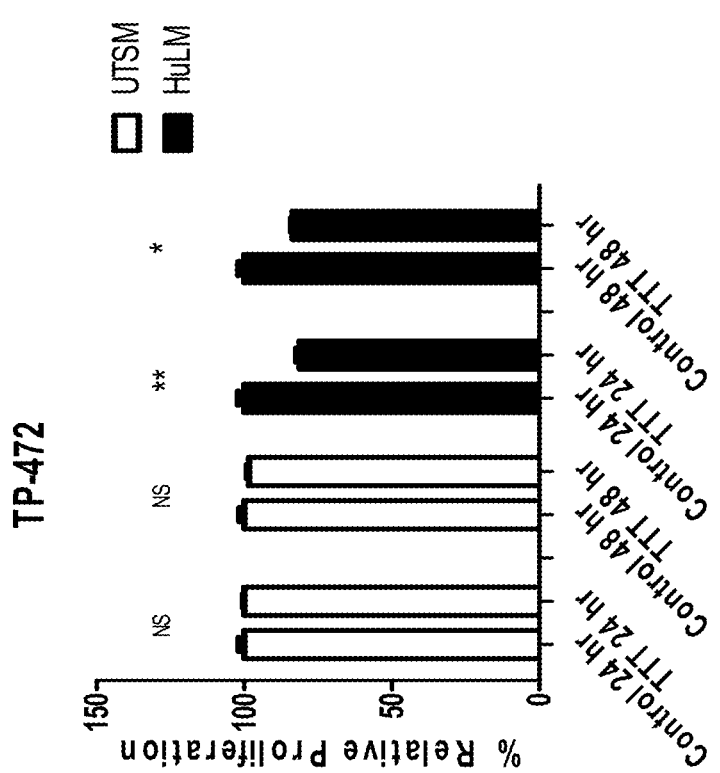
Figure 5B:
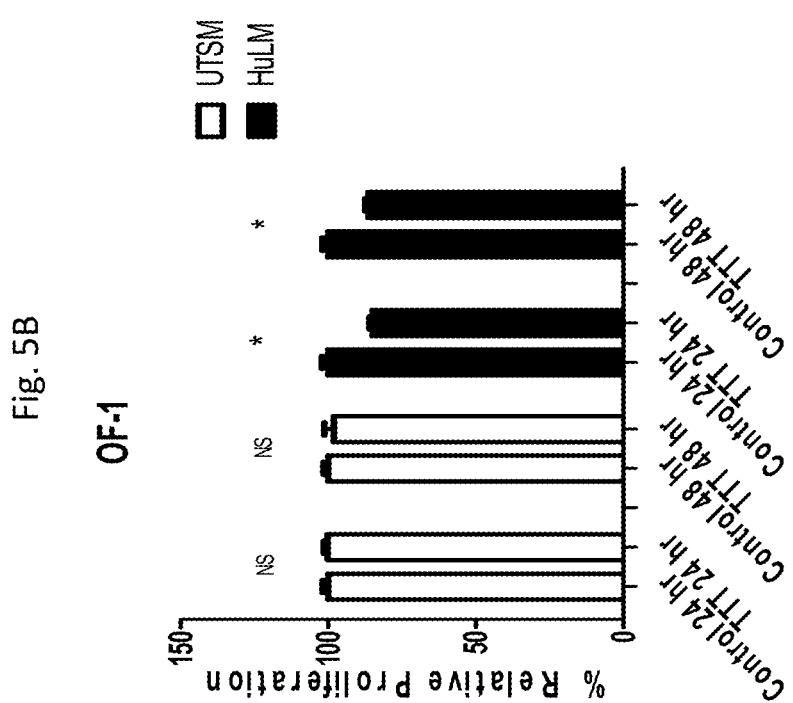

To examine the biological impact of BRD inhibition on the UFs, 14 BRD inhibitors, listed in Table 1 and select structures shown in FIGS. 4A-D, were screened to identify specific and potent BRD inhibitors in UF cells. Cell proliferation was measured in immortalized uterine smooth muscle (UTSM) and immortalized human uterine leiomyoma (HuLM) cells in the presence or absence of each BRD inhibitor for 24 hours and 48 hours respectively. 43% of these BRD inhibitors, TP-472 (FIG. 5A), OF-1 (FIG. 5B), LP99 (FIG. 5C), I-BRD9 (FIG. 5D), NVS-CECR2-1 (FIG. 5E), and BAZ2-ICR (FIG. 5F), selectively inhibited UF, but not myometrial cell proliferation.

Inhibiting BRD9 Suppresses the Phenotype of UF Cells

Figure 6A:
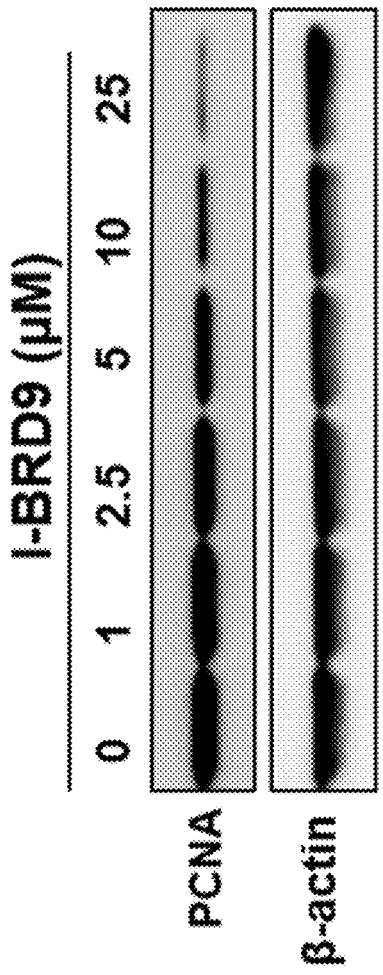
FIGS. 6A-6F are Western blot images of proliferating cell nuclear antigen (PCNA) and β actin levels in HuLM cells treated with 0-25 µM of I-BRD9 (FIG. 6A) or TP-472 (FIG. 6B) for 48 hours, Western blot images of fibronectin (FN) and β actin levels in HuLM cells treated with 0-25 µM of I-BRD9 (FIG. 6C) or TP-472 (FIG. 6D) for 48 hours, a Western blot image of the anti-apoptosis protein Bcl-2 and β actin levels in HuLM cells treated with 0-25 µM of I-BRD9 (FIG. 6E) for 48 hours, and a micrograph of HuLM cells treated with vehicle, I-bRD9, or TP-472 for 48 hours (FIG. 6F).
Figure 6B:
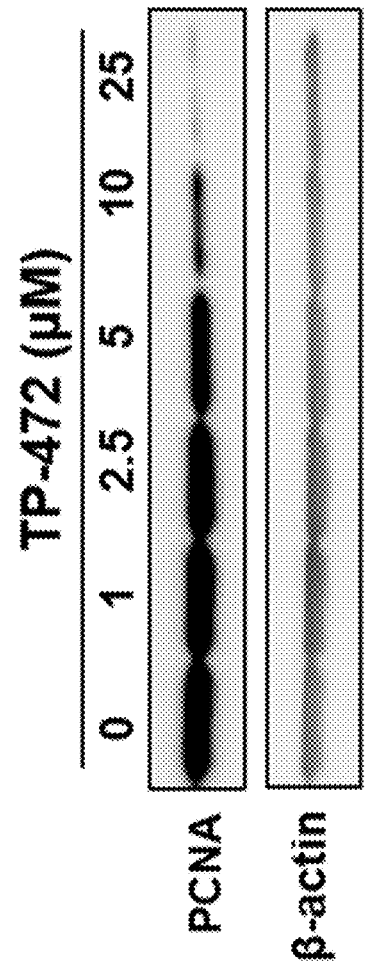
Figures 6C, 6D:
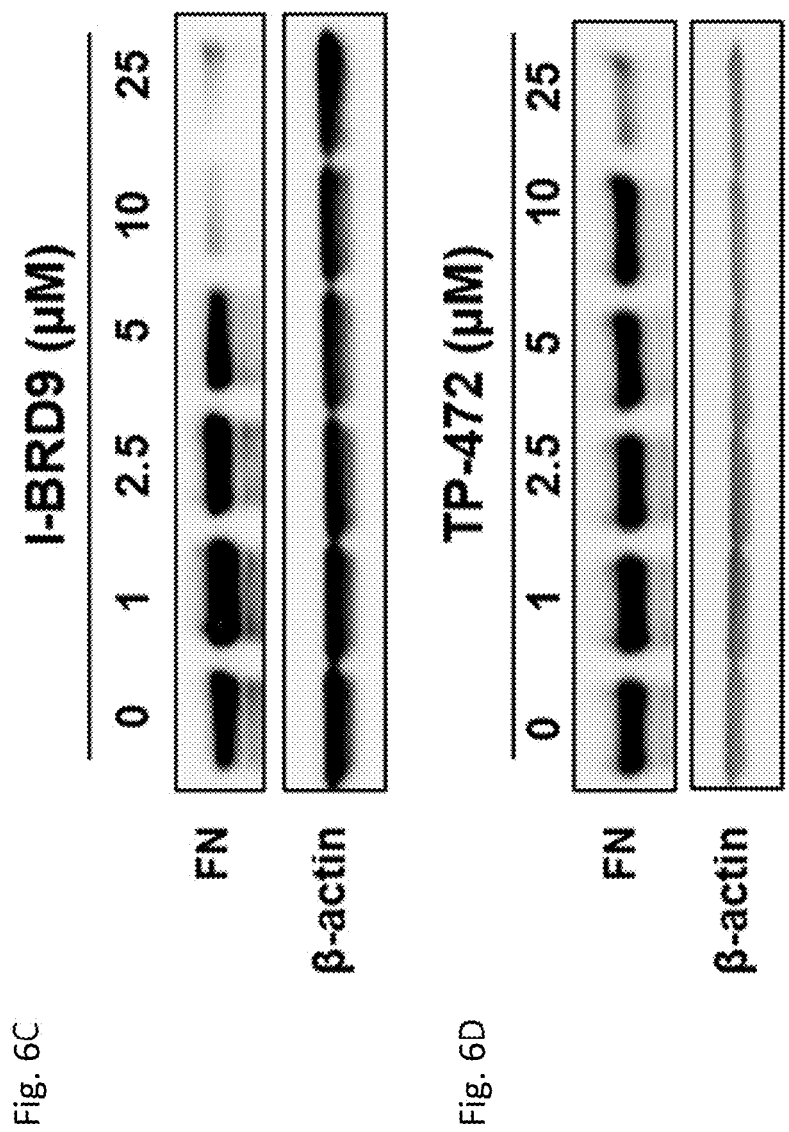
Figure 6E:
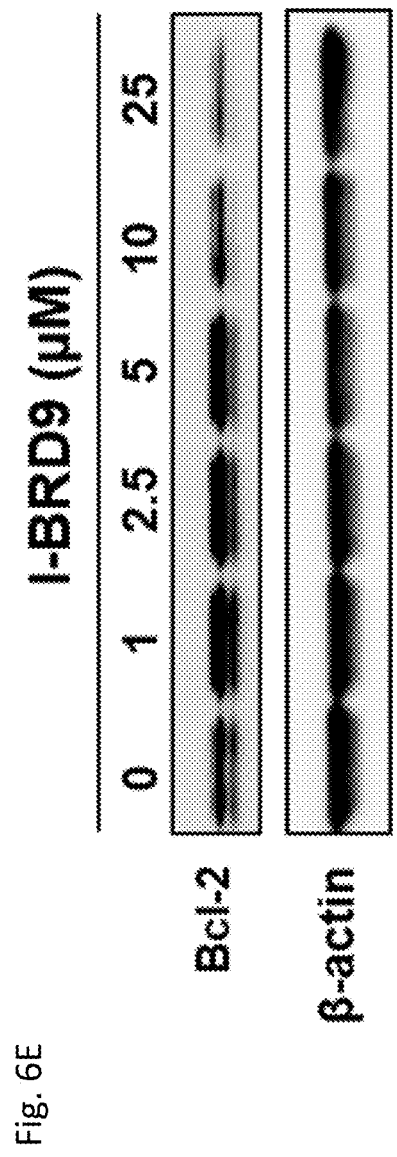
Figure 6F:
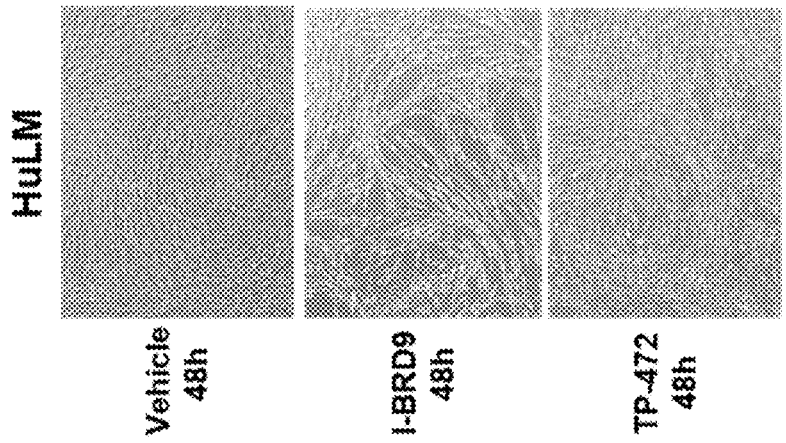
Figure 7B:
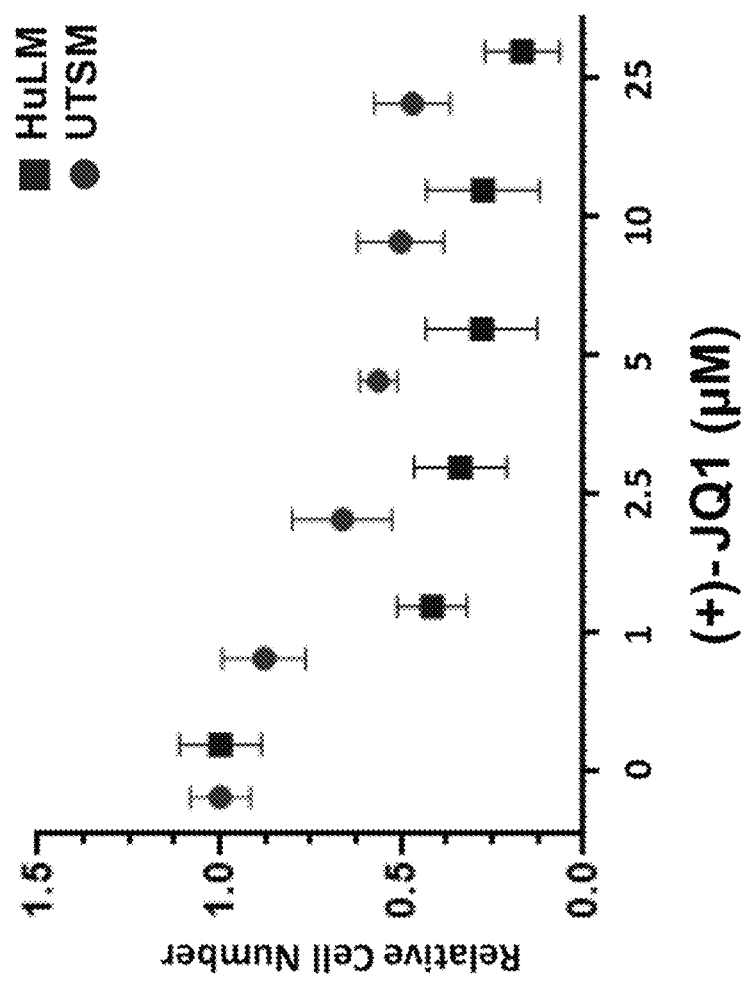

To examine how BRD inhibition affects UF cell phenotypes HuLM cells were cultured in the absence or presence of the BRD inhibitors I-BRD9 and TP-472. After treatment the cells underwent immunoblotting for proliferating cell nuclear antigen (PCNA) (FIGS. 6A-B) and fibronectin (FN) (FIG. 6C-D). Both I-BRD9 and TP-472 exhibited anti-uterine fibroid cell proliferation demonstrated by decreasing the levels of PCNA, a marker for cell proliferation. Both I-BRD9 and TP-472 also decreased FN levels. Additionally, I-BRD9 increased the expression of the anti-apoptosis protein BCL-2 (FIG. 6E). BRD9 inhibition also resulted in morphological changes to the HuLM cells as shown in (FIG. 6F). To further investigate the effects of BRD inhibition on cell proliferation UTSM and HuLM cells were in the absence or presence of the BRD inhibitors I-BET762 (FIG. 7A) and (+)-JQ1 (FIG. 7B). Both I-BET762 and (+)-JQ1 reduced cellular proliferation more potently in UF cells than myometrium cells in a dose dependent manner.

Inhibiting BRD9 Modulates the Levels of m6A Regulators in UF Cells

Figure 8A:
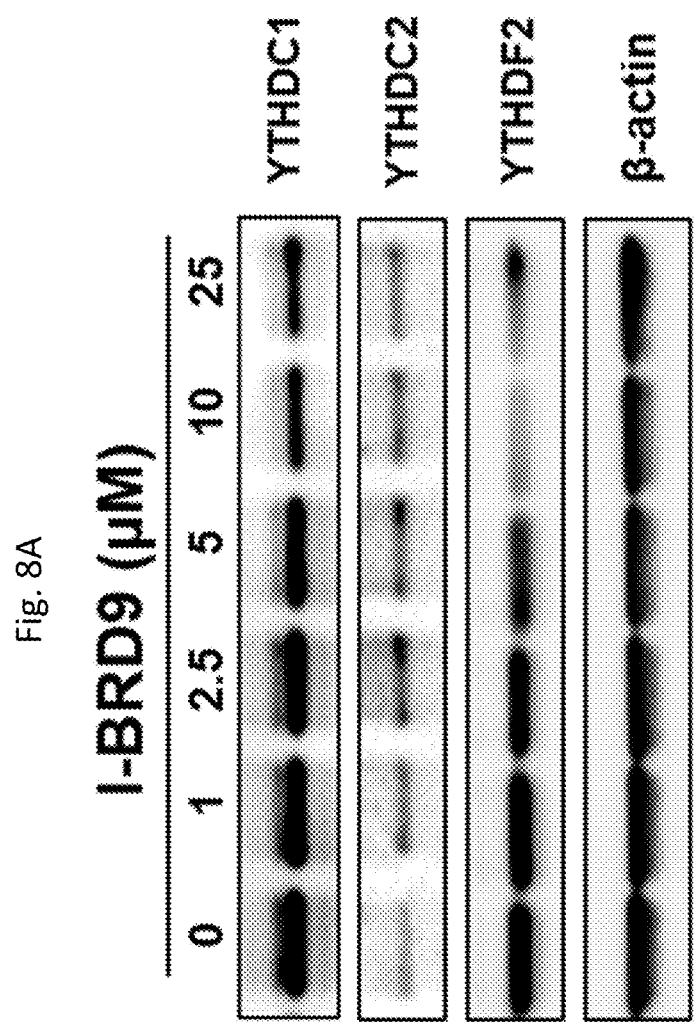
FIGS. 8A-8B are a Western blot image of YT521-B homology domain containing protein 1 (YTHDC1), of YT521-B homology domain containing protein 2 (YTHDC2), YT521-B homology domain N6-methyladenosine RNA binding protein 2 (YTHDF2), and β actin levels in HuLM cells treated with 0-25 µM of I-BRD9 (FIG. 8A) and a Western blot image of YTHDC1, YTHDC2, methyltransferase-like protein 3 (METTL3), and β actin levels in HuLM cells treated with 0-25 µM of TP-472 (FIG. 8B) for 48 hours.
Figure 8B:
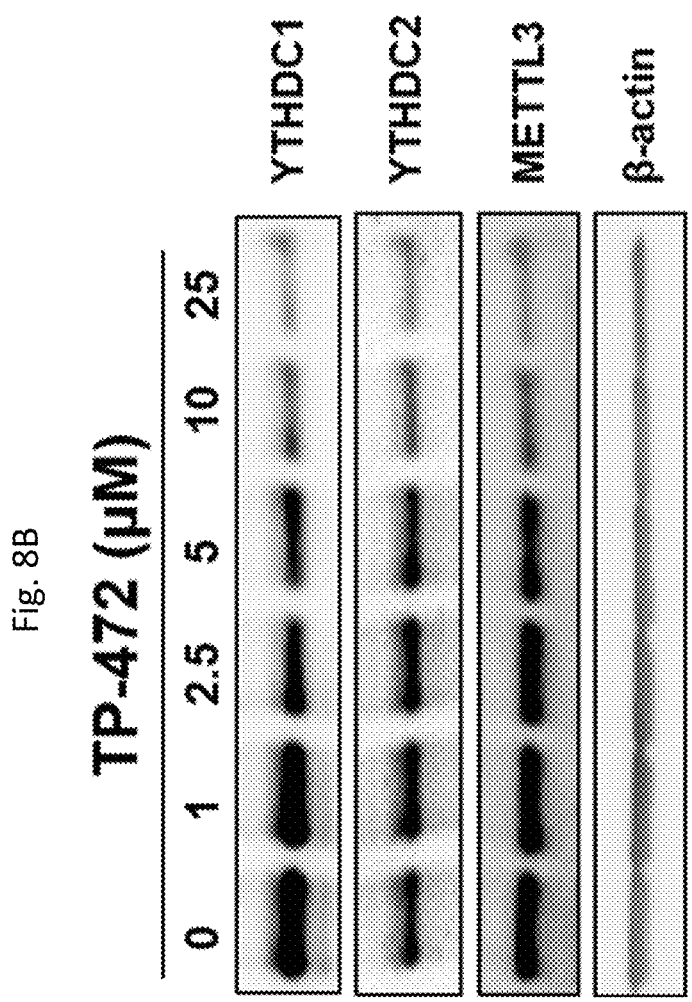

To investigate the role of BRD9 in m6A regulator levels in UF cells, HuLM cells were cultured in the absence or presence of the BRD inhibitors I-BRD9 and TP-472. After the treatment, the cells underwent immunoblot analysis for the m6A regulators YTHDC1, YTHDC2, YTHDF2, and METTL3. The inhibition of BRD9 with I-BRD9 demonstrates a dose-dependent downregulation of expression of YTHDC1, YTHDC2, and YTHDF2 (FIG. 8A). The inhibition of BRD9 with TP-472 demonstrates a dose-dependent downregulation of expression of YTHDC1, YTHDC2, and METTL3 (FIG. 8B). The inhibition of BRD proteins with I-BRD9 and TP-472 downregulating the expression of METTL3, YTHDC1, YTHDC2, and YTHDF2, which are the key regulators for m6A modification, indicates the tight link between BRD proteins and the epitranscriptomic landscape.

Figure 9B:
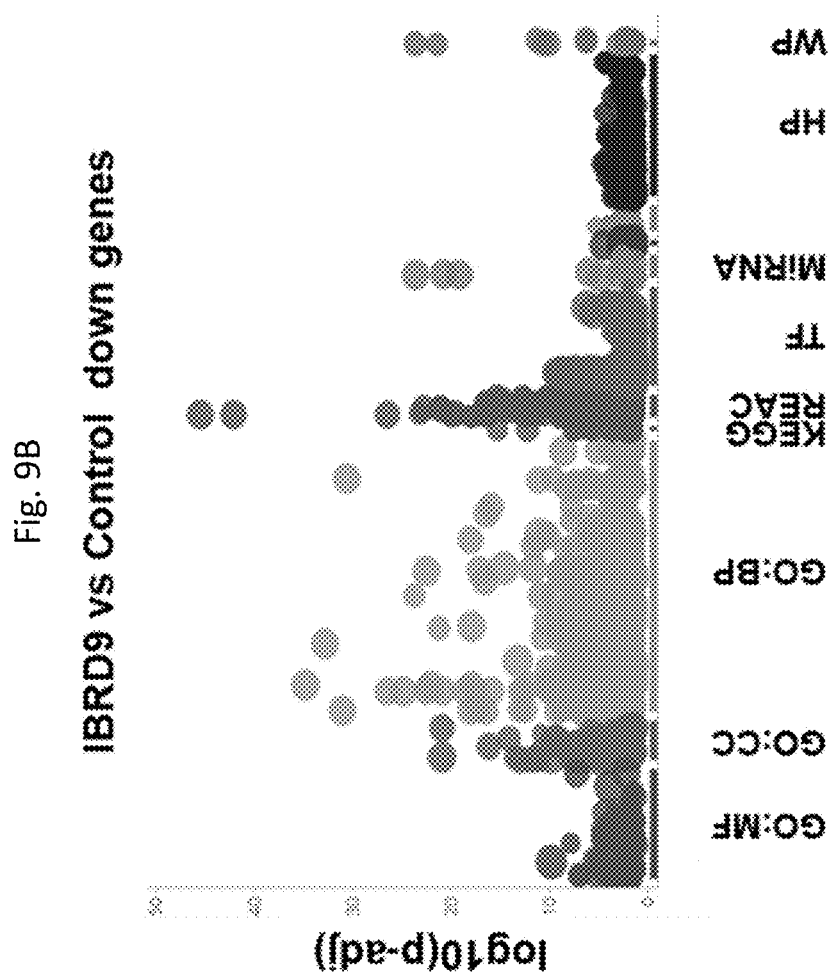
Figure 9C:
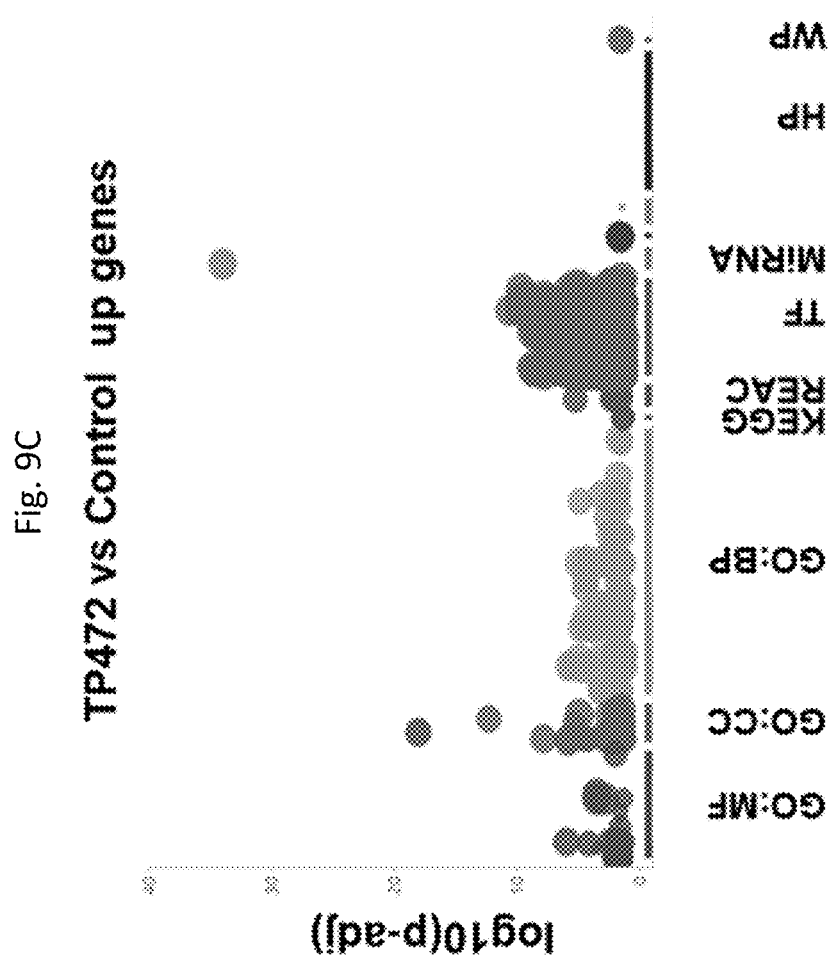
Figure 9D:
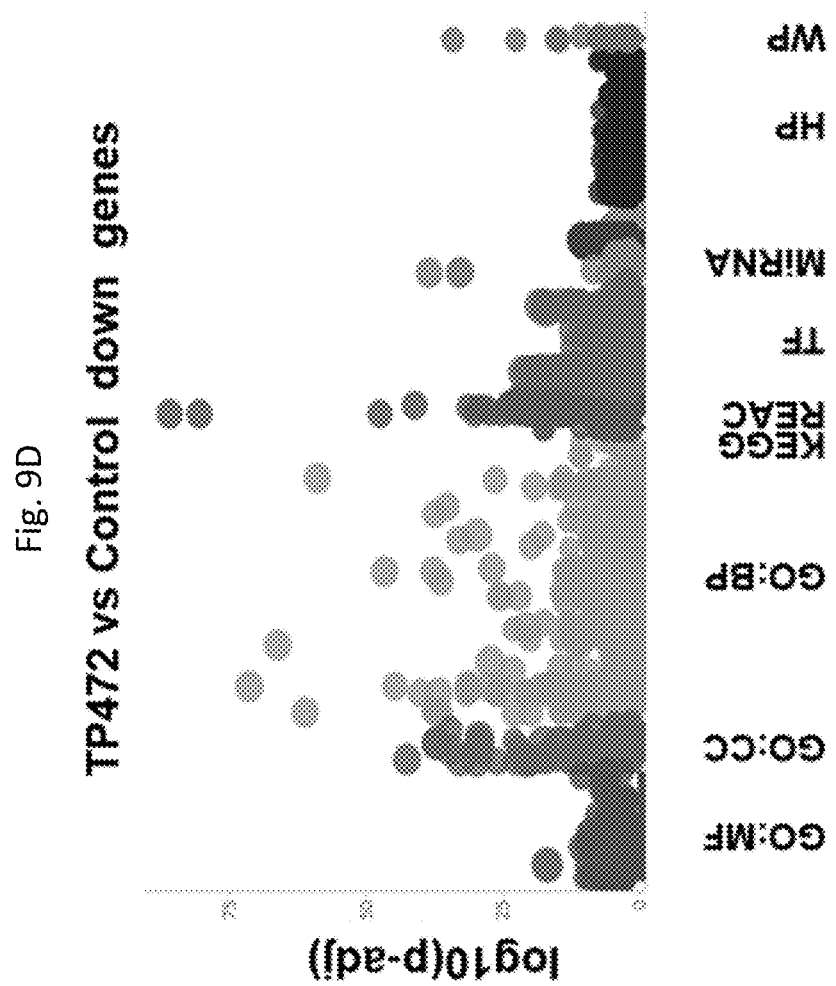

Inhibiting BRD9 Alters Pathways Related to Biological Processes and Transcription Factors in UF Cells To investigate the role of BRD9 in pathways related to biological processes and transcription factors HuLM cells were cultured in the absence or presence of the BRD inhibitors I-BRD9 or TP-472. After the treatment, RNA sequence analysis was performed. Transcriptome analysis reveals a distinct pattern between BRD9 inhibitors and control groups in uterine fibroid cells. Bioinformatic analysis showed that both IBRD9 (FIGS. 9A-B) and TP472 (FIGS. 9C-D) altered the pathways related to biological processes, transcriptional factors, etc.

Figure 10A:
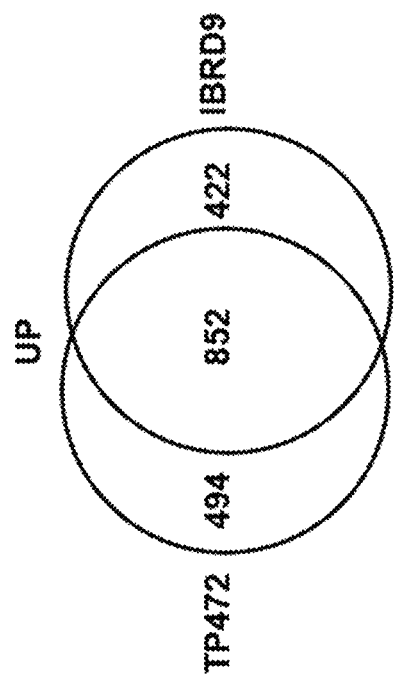
FIGS. 10A-10B are Venn diagrams of the upregulated genes in HuLM cells treated with I-BRD9 and TP-472 (FIG. 10A) and of the downregulated genes in HuLM cells treated with I-BRD9 and TP-472 (FIG. 10B).
Figure 10B:
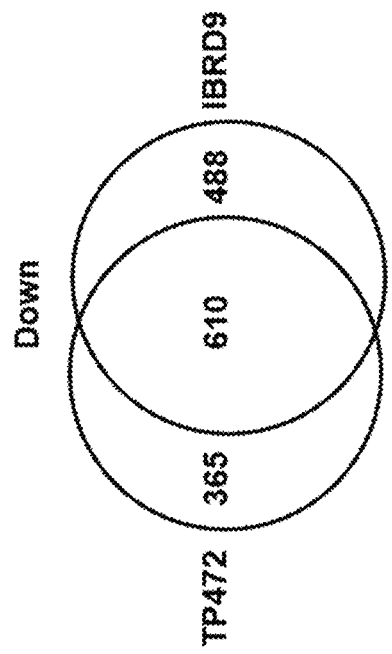

Further analysis was performed to identify differentially expressed genes (DEGs) between the I-BRD9 and TP-472 treatment groups (Table 2). VOOM analysis showed that I-BRD9 and TP-472 shared 852 up-regulated genes (FIG. 10A) and 610 downregulated genes (FIG. 10B). Hallmark analysis reveals a commonly distinct pathway alteration in response to inhibition of BRD by both TP472 and IBRD9, such as E2F, MYC Target, G2M checkpoint, and mitotic spindle pathways.

TABLE 2

Table of Differentially Expressed Genes (DEGs)

|  | IBRD9 vs Control | TP472 vs Control |
|---|---|---|
| Downregulated | 1098 | 975 |
| Not Significant | 9788 | 9839 |
| Upregulated | 1274 | 1346 |

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred aspects of this invention are described herein, including the best mode known to the inventors for carrying out the invention. Variations of those preferred aspects may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of treating a uterine fibroid in a female mammal, the method comprising administering to the female mammal an effective amount of an inhibitor of bromodomain protein (BRD).

2. The method of claim 1, wherein the inhibitor of BRD is TP-472, I-BRD9, JQ1, or I-BET762.

3. The method of claim 2, wherein the inhibitor of BRD is TP-472.

4. The method of claim 1, wherein the female mammal is a human.

5. The method of claim 2, wherein the female mammal is a human.

6. The method of claim 3, wherein the female mammal is a human.

7. The method of claim 2, wherein the inhibitor of BRD is I-BRD9.

8. The method of claim 7, wherein the female mammal is a human.

9. The method of claim 2, wherein the inhibitor of BRD is JQ1.

10. The method of claim 2, wherein the inhibitor of BRD is I-BET762.

11. The method of claim 9, wherein the female mammal is a human.

12. The method of claim 10, wherein the female mammal is a human.

* * * * *